US009832934B2

(12) United States Patent
Riccobene et al.

(10) Patent No.: US 9,832,934 B2
(45) Date of Patent: Dec. 5, 2017

(54) EDGER HAVING CONNECTION SURFACES

(71) Applicant: Keystone Retaining Wall Systems LLC, Minneapolis, MN (US)

(72) Inventors: Thomas S. Riccobene, Albuquerque, NM (US); Robert A. MacDonald, Plymouth, MN (US)

(73) Assignee: KEYSTONE RETAINING WALL SYSTEMS LLC, Minneapolis, MN (US)

( * ) Notice: Subject to any disclaimer, the term of this patent is extended or adjusted under 35 U.S.C. 154(b) by 0 days.

(21) Appl. No.: 15/052,782

(22) Filed: Feb. 24, 2016

(65) Prior Publication Data

US 2016/0242364 A1  Aug. 25, 2016

Related U.S. Application Data

(60) Provisional application No. 62/119,914, filed on Feb. 24, 2015.

(51) Int. Cl.
*A01G 1/08* (2006.01)
(52) U.S. Cl.
CPC ..................... *A01G 1/08* (2013.01)
(58) Field of Classification Search
CPC A01G 1/08; E04H 4/141; E01C 11/22; E01C 11/221; E01C 11/222; E01C 5/00; E01C 5/04
See application file for complete search history.

(56) References Cited

U.S. PATENT DOCUMENTS 2,344,302 A * 3/1944 Harza ................. E02B 3/14
                                                  405/16
D182,124 S * 2/1958 Kearney et al. ............. 52/102
(Continued)

FOREIGN PATENT DOCUMENTS

DE  WO 2010006716 A1 * 1/2010 ............ A01G 1/08
JP     08-311808 A    11/1996
JP      08311808   * 11/1996 ............ A01G 1/08

OTHER PUBLICATIONS

International Search Report for International application No. PCT/US2016/019417 dated Jun. 28, 2016.
(Continued)

*Primary Examiner* — Kathleen Alker
(74) *Attorney, Agent, or Firm* — Greer, Burns & Crain, Ltd.

(57) ABSTRACT

An edging unit comprises a structure having opposed top and bottom surfaces, opposed first and second side surfaces extending between the opposed top and bottom surfaces, and opposed first and second end surfaces extending between the opposed top and bottom surfaces and between the first and second side surfaces. The top surface comprises at least one pair of opposed segments. Each pair of segments includes first and second segments respectively opposing one another with respect to a center of the edging unit. The first segment defines a first upward or downward slope between the first side surface and the second side surface and the second segment defines a second upward or downward slope between the first side surface and the second side surface generally opposite in direction to the first slope.

12 Claims, 29 Drawing Sheets

(56) References Cited

U.S. PATENT DOCUMENTS

| | | | | |
|---|---|---|---|---|
| 4,229,123 A | * | 10/1980 | Heinzmann | E02D 29/025 405/273 |
| 5,564,240 A | * | 10/1996 | Dean, Jr. | E01C 11/221 47/33 |
| 5,615,971 A | * | 4/1997 | Boev e | B28B 7/346 404/37 |
| 6,591,547 B1 | * | 7/2003 | Staten | A01G 1/08 47/33 |
| 6,944,998 B1 | | 9/2005 | King | |
| 7,503,729 B2 | | 3/2009 | Hammer et al. | |
| D674,510 S | * | 1/2013 | Riccobene | D25/113 |
| D680,233 S | * | 4/2013 | Riccobene | D25/113 |
| D680,663 S | * | 4/2013 | Riccobene | D25/113 |
| D680,664 S | * | 4/2013 | Riccobene | D25/113 |
| 2002/0112415 A1 | * | 8/2002 | Eakin | A01G 1/08 52/102 |
| 2005/0028438 A1 | * | 2/2005 | Campana | A01G 1/08 47/33 |
| 2005/0050823 A1 | * | 3/2005 | Whitson | A01G 1/08 52/311.1 |
| 2009/0293377 A1 | * | 12/2009 | Doman | E02D 27/00 52/102 |
| 2013/0067845 A1 | * | 3/2013 | MacDonald | E04C 1/395 52/563 |
| 2014/0140766 A1 | | 5/2014 | Riccobene et al. | |
| 2014/0215932 A1 | * | 8/2014 | Johnson | A01G 1/08 52/102 |
| 2016/0244936 A1 | * | 8/2016 | MacDonald | B28B 7/0041 |

OTHER PUBLICATIONS

Written Opinion from corresponding International Patent Application No. PCT/US2016/019417, dated Aug. 29, 2017.

* cited by examiner

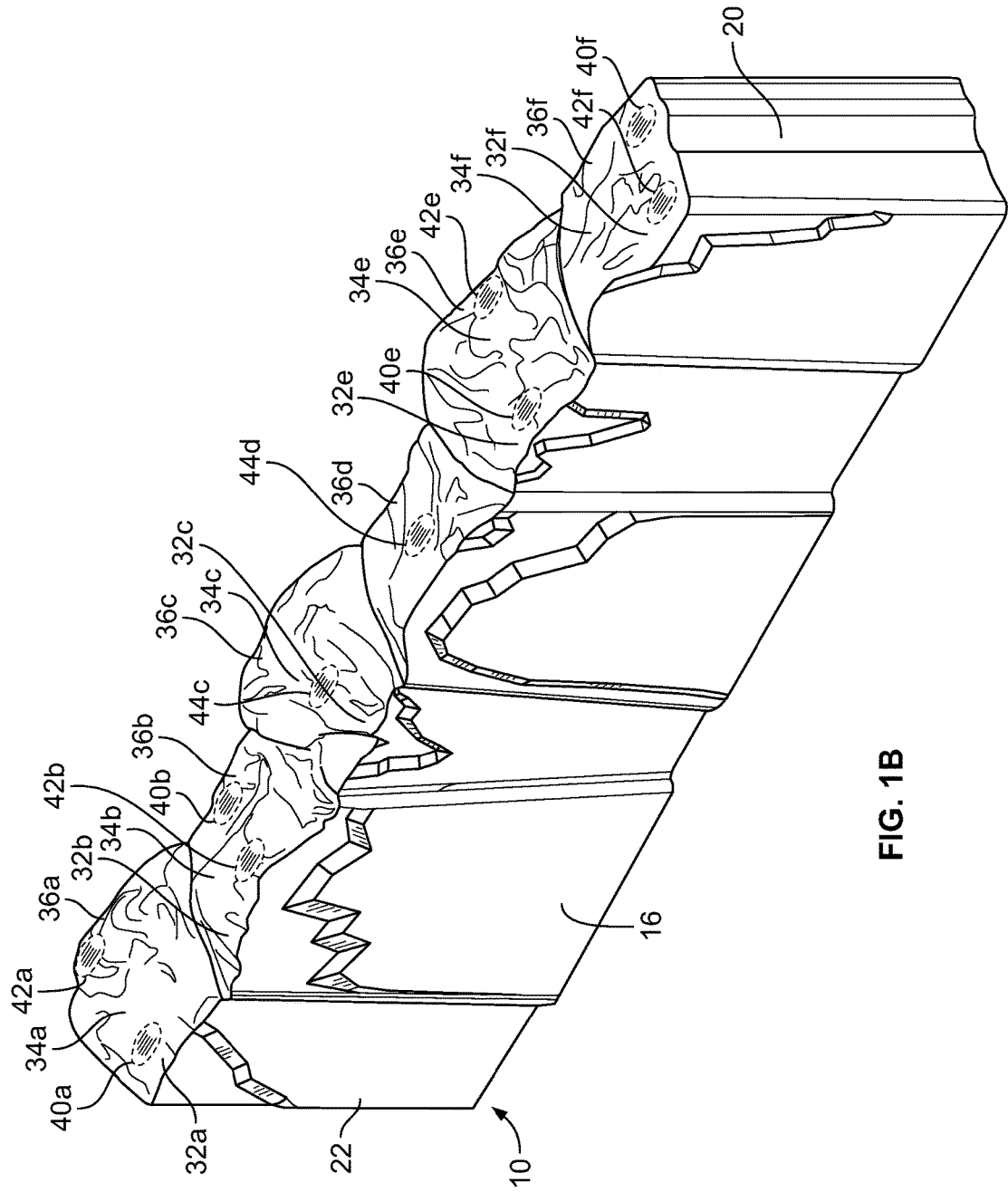

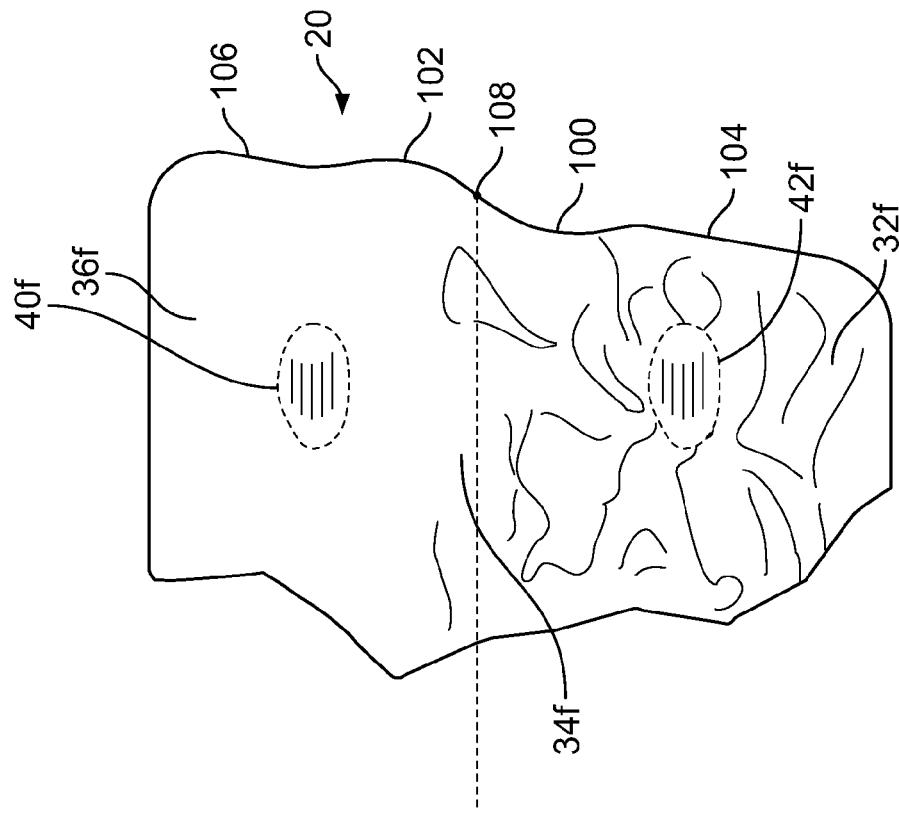
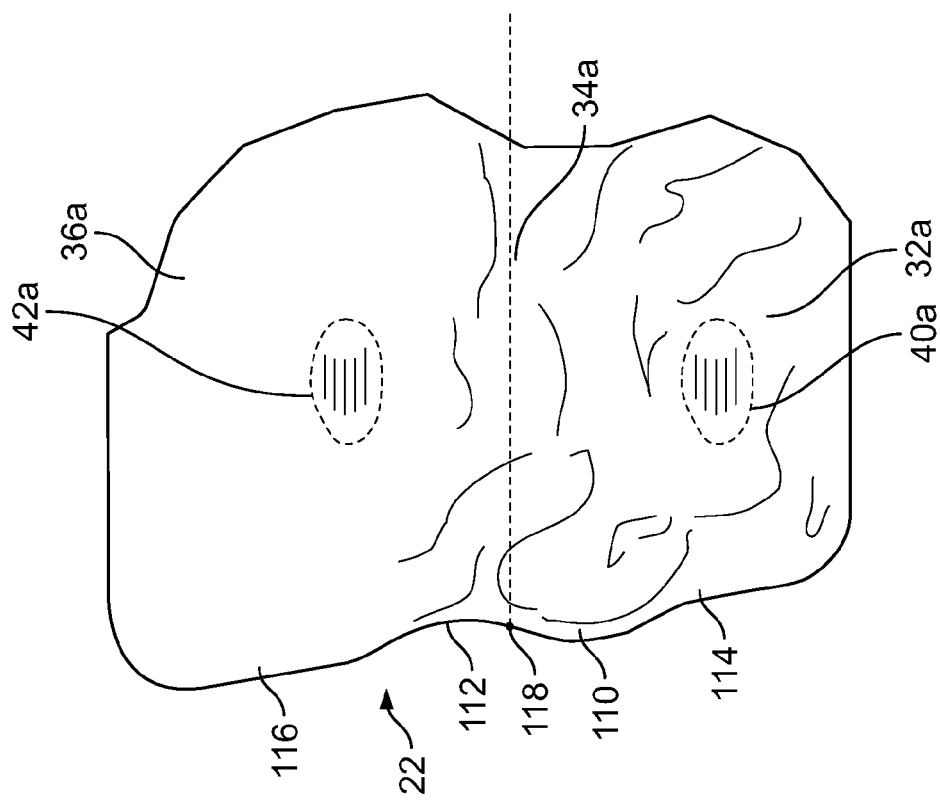

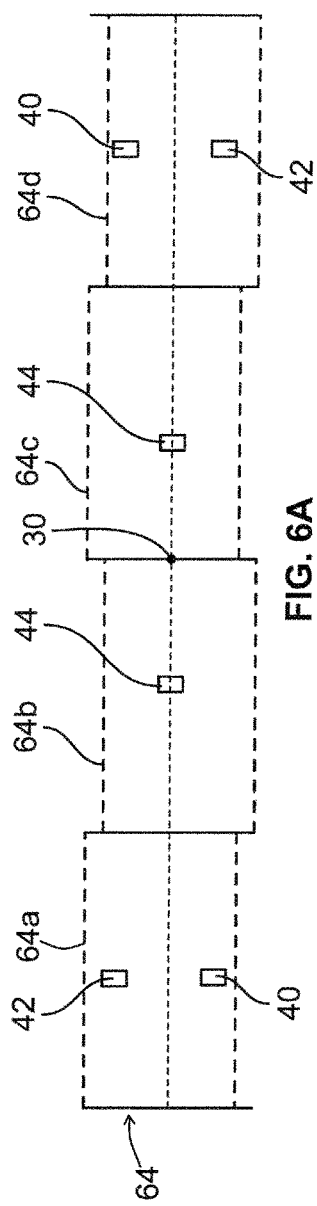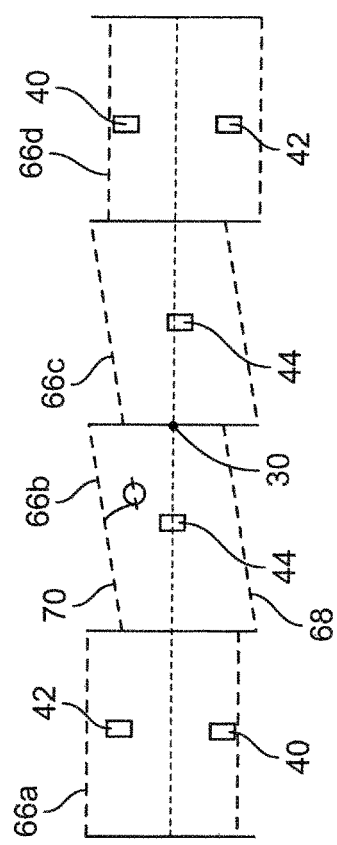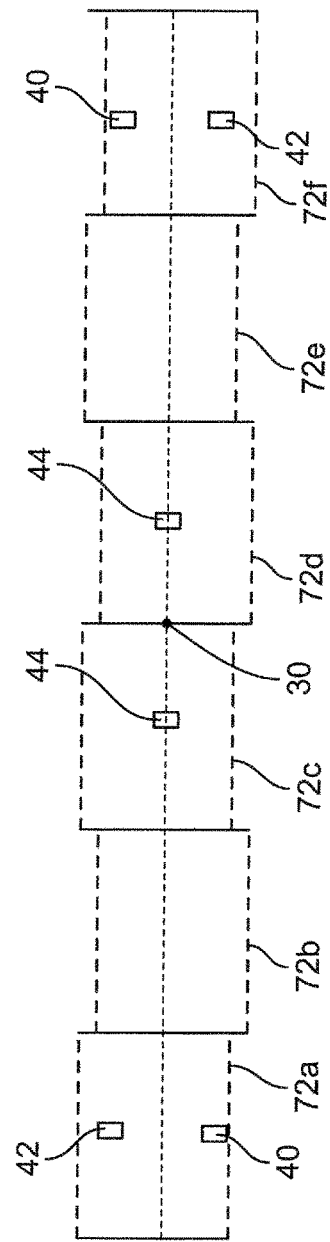

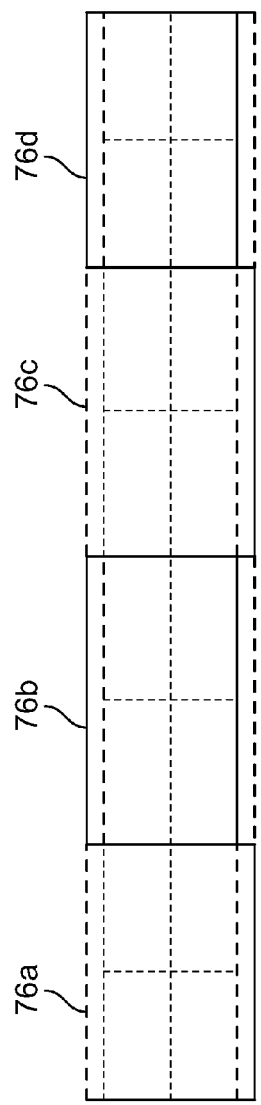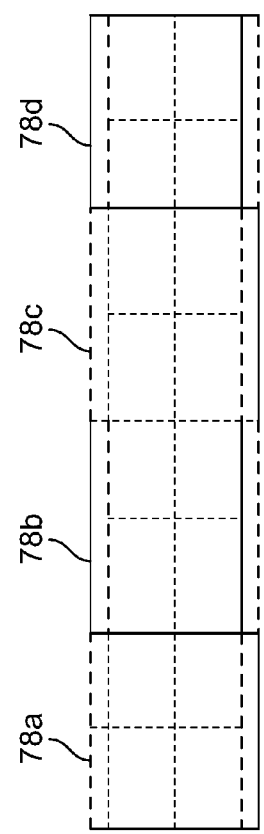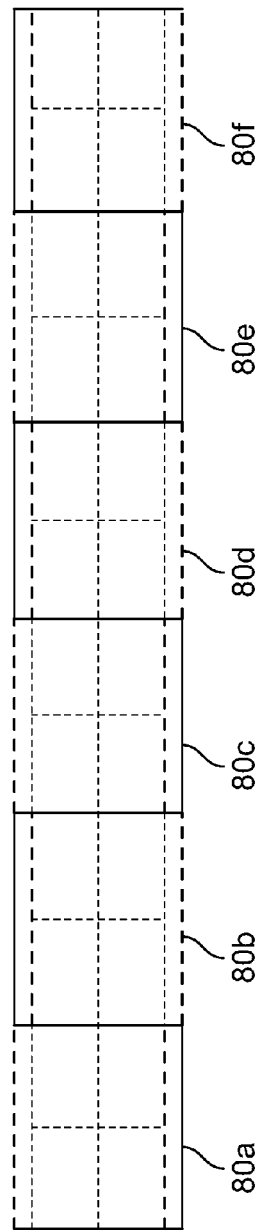

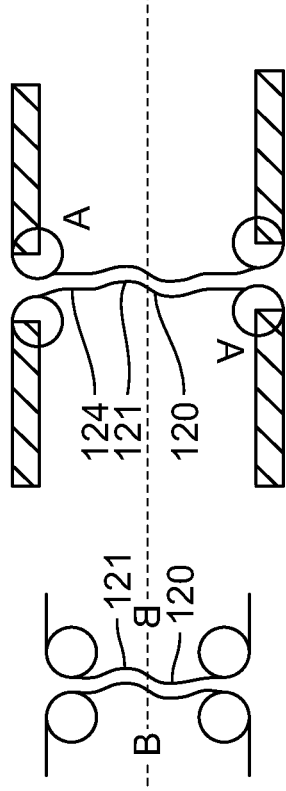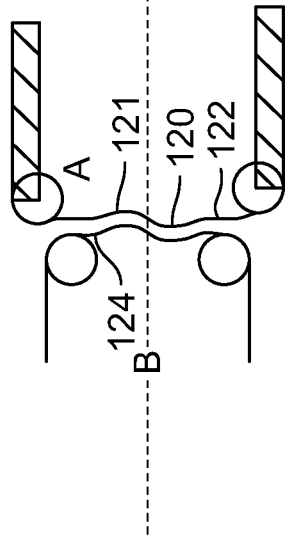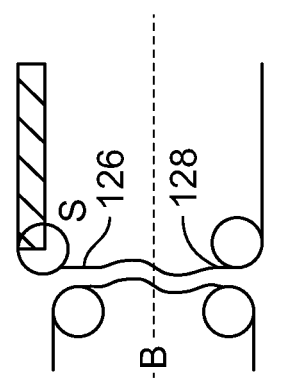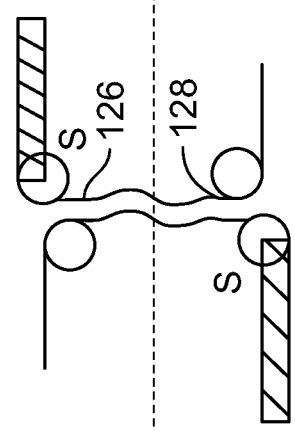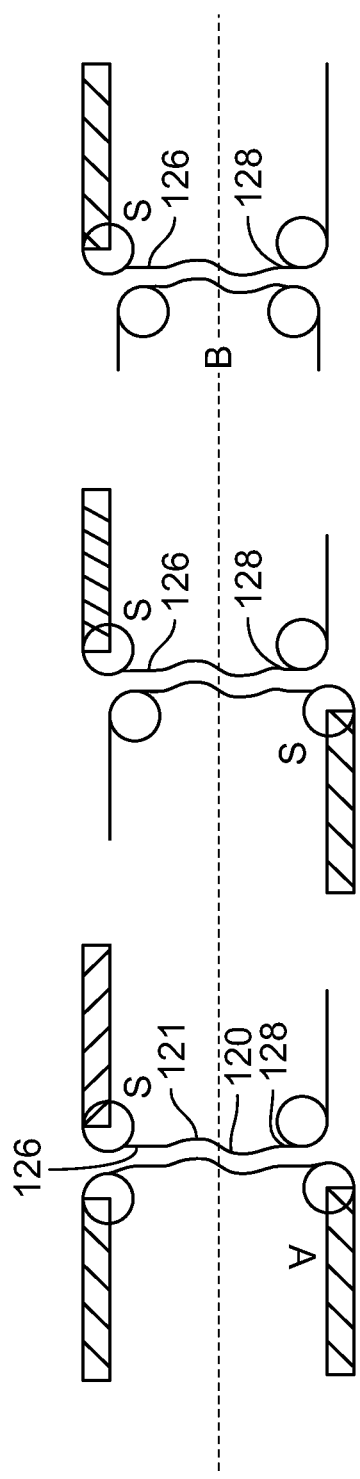
FIG. 11A FIG. 11B FIG. 11C FIG. 11D FIG. 11E FIG. 11F

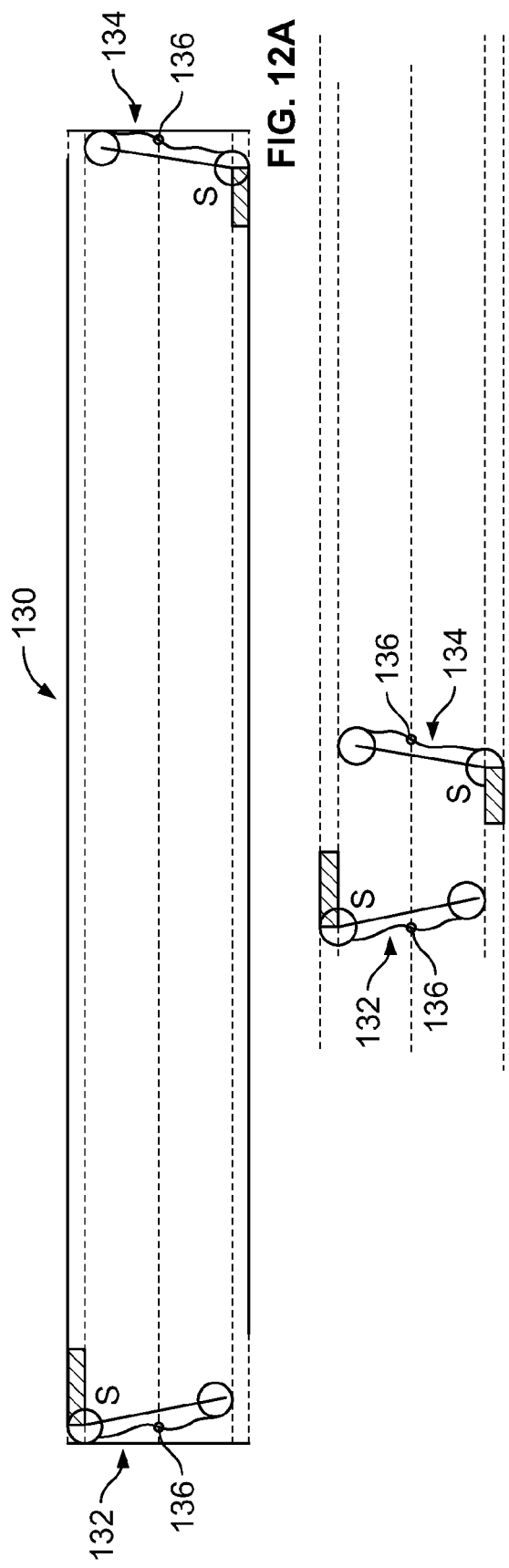

EDGER HAVING CONNECTION SURFACES

PRIORITY CLAIM AND REFERENCE TO RELATED APPLICATIONS

This application claims priority to U.S. Provisional Patent Application Ser. No. 62/119,914, filed Feb. 24, 2015, which is incorporated in its entirety by reference herein.

This application incorporates by reference in its entirety U.S. patent application Ser. No. 14/081,976, filed Nov. 15, 2013 and entitled CONNECTION SURFACE FOR A STRUCTURAL UNIT.

FIELD OF THE INVENTION

The present invention relates to edging units (edgers) for use in landscaping, and particularly to an edging system using edging units having connection surfaces that can be arranged in relationship to each other in different configurations.

BACKGROUND OF THE INVENTION

Edgers are often comprised of concrete bricks or tiles that are arranged to form an edge or border in landscaping applications. Conventional edgers are typically elongated and are adapted to be partially buried in the earth in an end-to-end relationship.

SUMMARY OF THE INVENTION

Embodiments of the invention provide, among other things, an edging unit. The edging unit comprises a structure having opposed top and bottom surfaces, opposed first and second side surfaces extending between the opposed top and bottom surfaces, and opposed first and second end surfaces extending between the opposed top and bottom surfaces and between the first and second side surfaces. The top surface comprises at least one pair of opposed segments, where each pair of segments includes first and second segments respectively opposing one another with respect to a center of the edging unit. The first segment defines a first upward or downward slope between the first side surface and the second side surface and the second segment defines a second upward or downward slope between the first side surface and the second side surface generally opposite in direction to the first upward or downward slope.

BRIEF DESCRIPTION OF THE DRAWINGS

The drawings are merely examples of one or more embodiments of the present invention in which:

FIGS. 1A-1D are, top plan, perspective, front elevation, and end elevation views, respectively, of an edging unit according to a first embodiment of the present invention;

FIGS. 2A and 2B are enlarged top plan views of left and right end portions, respectively, of the edging unit of FIGS. 1A-1D;

FIGS. 6A-6F are simplified top plan views of edging units according to sixth, seventh, and eighth embodiments of the invention, illustrating example stacking points;

FIGS. 11A-11F are simplified top plan views of portions of connected edging units, illustrating various end connections, where FIGS. 11D-11F show example offset connections;

FIGS. 12A-12B are simplified top plan views of portions of an edging units having end surfaces with angled profiles similar to those shown in FIGS. 11D-11F;

DETAILED DESCRIPTION

Figure 1A:
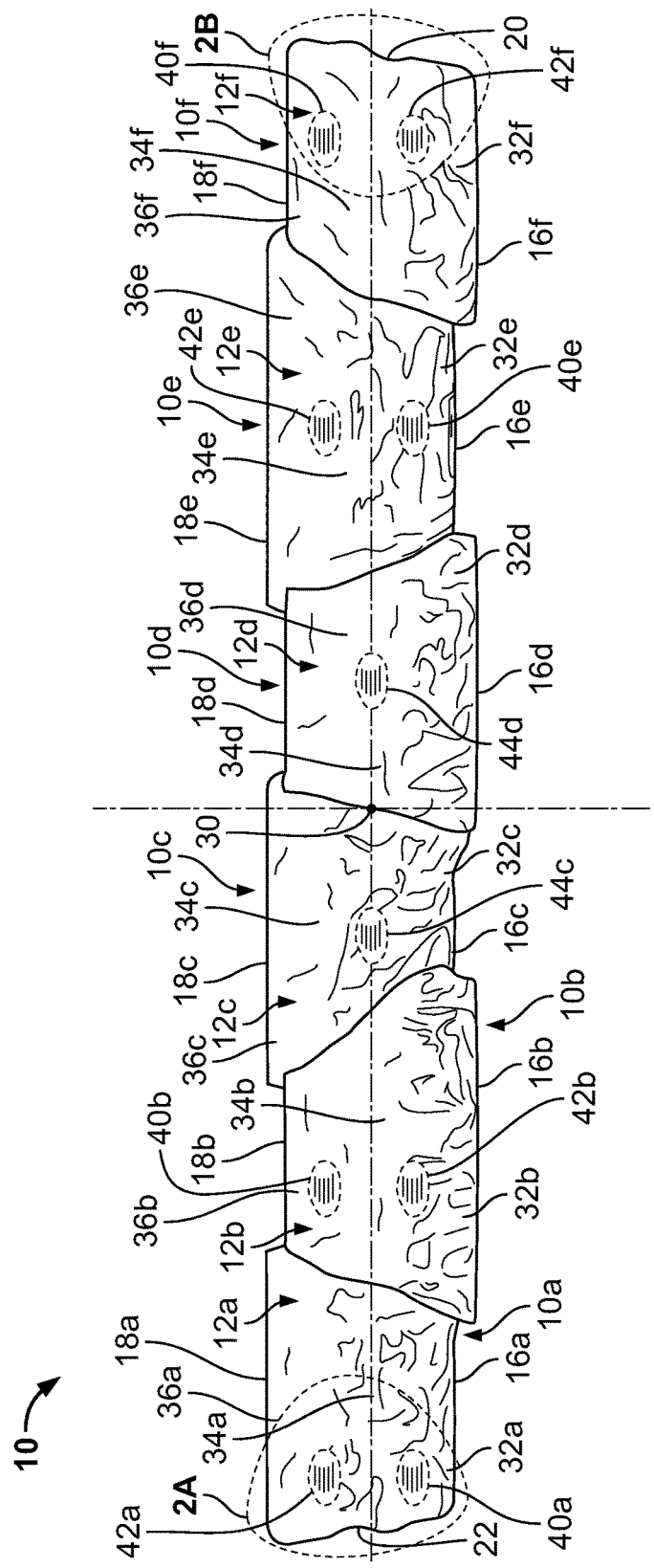
Figure 1C:
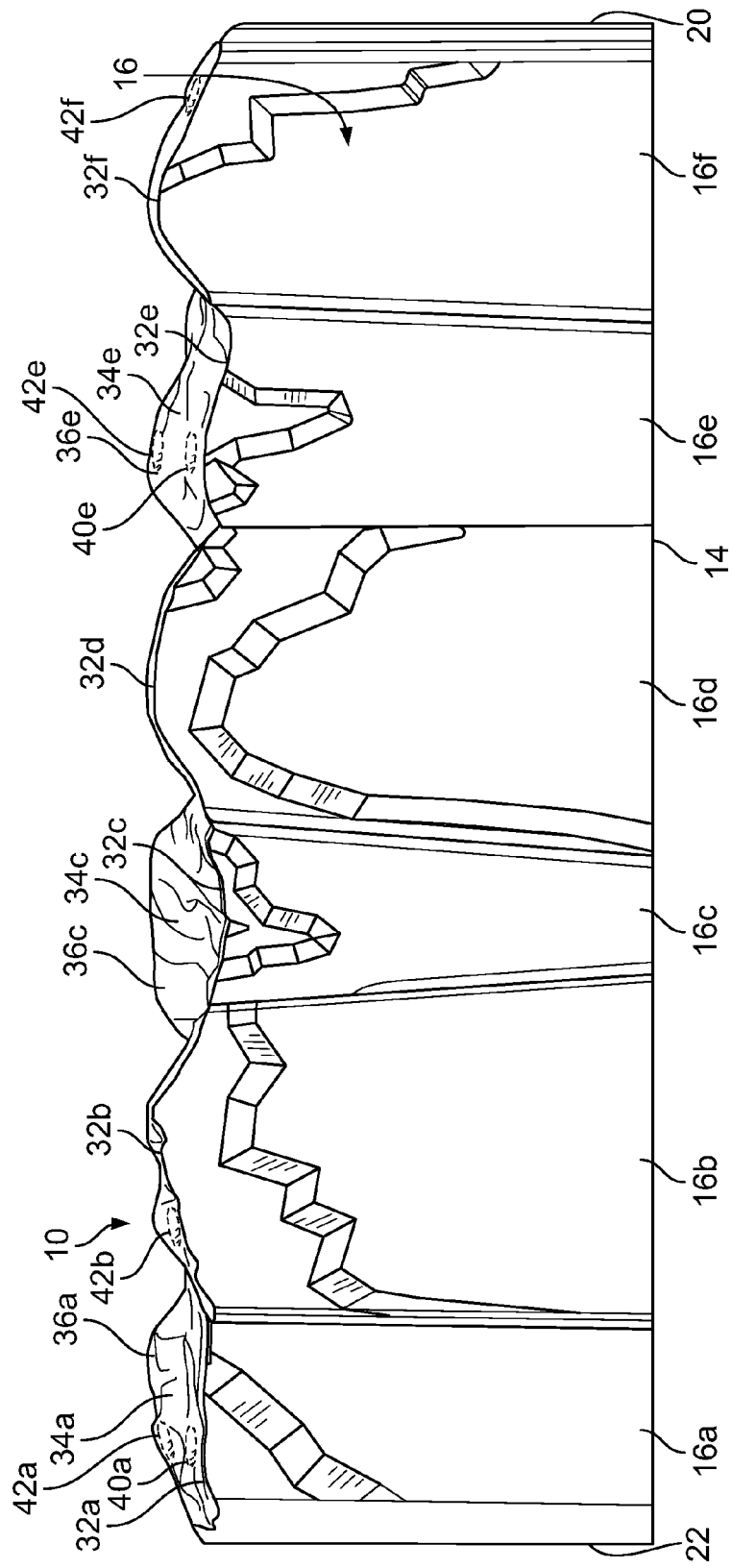

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Referring to FIGS. 1A-1D, an example embodiment edging unit is indicated generally at 10, and is shown standing. The edging unit 10 includes a top surface 12, a bottom surface 14 (which in an example embodiment is generally flat) opposed to the top surface, a first side surface 16, a second side surface 18 opposed to the first side surface, which can be (but need not be) configured similarly to the first side surface, a first end surface 20, and a second end surface 22 opposed to the first end surface. It will be appreciated that "first" and "second" are used merely for convenience in illustration.

The edging unit 10 includes (or defines) a plurality of segments 10a, 10b, 10c, 10d, 10e, and 10f, which are preferably arranged in a plurality of pairs of opposed segments. "Segments" as used herein refer to continuous portions having respectively varying slopes configured to nest with one another at one or more points. Such portions may be shown or defined, for example, by breaks, edges, ridges, opposing slopes, etc. However, segments, such as segments 10a, 10b, 10c, 10d, 10e, and 10f, are preferably not separated from one another, and instead are joined. Preferably, this joining is permanent, such as with a unitary structure, though it is also contemplated that segments may be separable.

Each of the pairs of segments opposes the other of the pair of segments with respect to a front-to-back center axis (shown as vertical in FIG. 1A) extending through the center 30 of the edging unit. More particularly, at least the centers of the opposing segments preferably oppose one another with respect to the center 30, though it is possible that a portion of a segment may still encroach upon an opposing side of the center 30, for instance due to the shape of a particular segment (such as the trapezoidal segments shown in FIG. 1). In the example edging unit 10, segments 10c and 10d form an inner pair of segments, segments 10b and 10e form a next outer pair of segments, and segments 10a and 10f form a third, outermost pair of segments. In other example embodiments, only two pairs of segments, an inner pair and an outer pair, are provided, or only a single pair of segments can be provided. In still other example embodiments, more than three pairs of segments are provided. Preferably, two or more pairs of segments are combined to make a unit.

The segments 10a, 10b, 10c, 10d, 10e, 10f are defined by features of the top surface 12, and preferably also features of the first and the second side surfaces 16, 18. Such features include any suitable surface features for delineating the segments. For example, as shown in FIG. 1A, the top surface 12 includes segments 12a, 12b, 12c, 12d, 12e, and 12f, divided from one another by interposed ridges. In some embodiments, but not in all embodiments, the first side surface 16 includes segments 16a, 16b, 16c, 16d, 16e, and 16f, which are aligned (along a longitudinal direction of the edging unit 10) with the segments 12a, 12b, 12c, 12d, 12e, and 12f of the top surface 12, respectively. Similarly, in some embodiments, but not in all embodiments, the second side surface 18 includes segments 18a, 18b, 18c, 18d, 18e, and 18f, which are aligned (along a longitudinal direction of the edging unit 10) with the segments 12a, 12b, 12c, 12d, 12e, and 12f of the top surface 12, respectively. Thus, segment 10a can be defined by top surface segment 12a, and preferably also first and side surface segments 16a, 18a, segment 10b can be defined by top surface segment 12b, and preferably also first and second side surface segments 16b, 18b, and so on.

Each of the top surfaces 12a, 12b, 12c, 12d, 12e, 12f include a substantially upward or downward slope ("substantially" refers to the possibility for portions of the overall slope to be irregular or not completely upward or downward sloping) extending between the first side surface 16 and the second side surface 18. For each segment of an opposed pair of segments, the upward or downward slopes are generally opposite in direction to one another. For example, for the innermost pair of segments 10c, 10d, top surface segment 12c includes a lower surface 32c near the first side surface segment 16c that transitions to an upward slope 34c to an upper surface 36c near the second side surface segment 18c. By contrast, top surface segment 12d includes an upper surface 32d near the first side surface segment 16d that transitions to a downward slope 34d to a lower surface 36d near the second side surface segment 18c. For the next outer opposing pair of segments 10b, 10e, segment 10b includes a downwardly sloped portion 34b between first side surface segment 16b and second side surface segment 18b, while opposed segment 10e includes an upwardly sloped portion 34e between first side surface segment 16e and second side surface segment 18e. A similar pattern exists for the outermost pair of segments 10a, 10f.

Further, for each pair of opposed segments, the segment having an upwardly facing surface opposes the segment having an upwardly facing surface in the next outer pair of opposed segments with respect to the center 30 to provide alternating slopes for the segments 10a, 10b, 10c, 10d, 10e, 10f across the edging unit 10. As shown in FIGS. 1A and 1B, for example, upwardly facing surface 34c of the innermost pair of segments 10c, 10d is on the opposite end of the edging unit 10 from the upwardly facing surface 34e of the next outer pair of segments 10b, 10e. Similarly, upwardly facing surface 34e is on the opposite end of the edging unit 10 from the upwardly facing surfaces 34a, 34c of both the innermost and outermost pair of segments 10a, 10c. This provides top surface segments 12a, 12b, 12c, 12d, 12e, 12f having respectively alternating upward and downward slopes 34a, 34b, 34c, 34d, 34e, 34f. Additionally, each opposing pair of segments also has opposing upward and downward slopes. In some embodiments, the top surface segments are merely defined by such opposing slopes.

Figure 4:
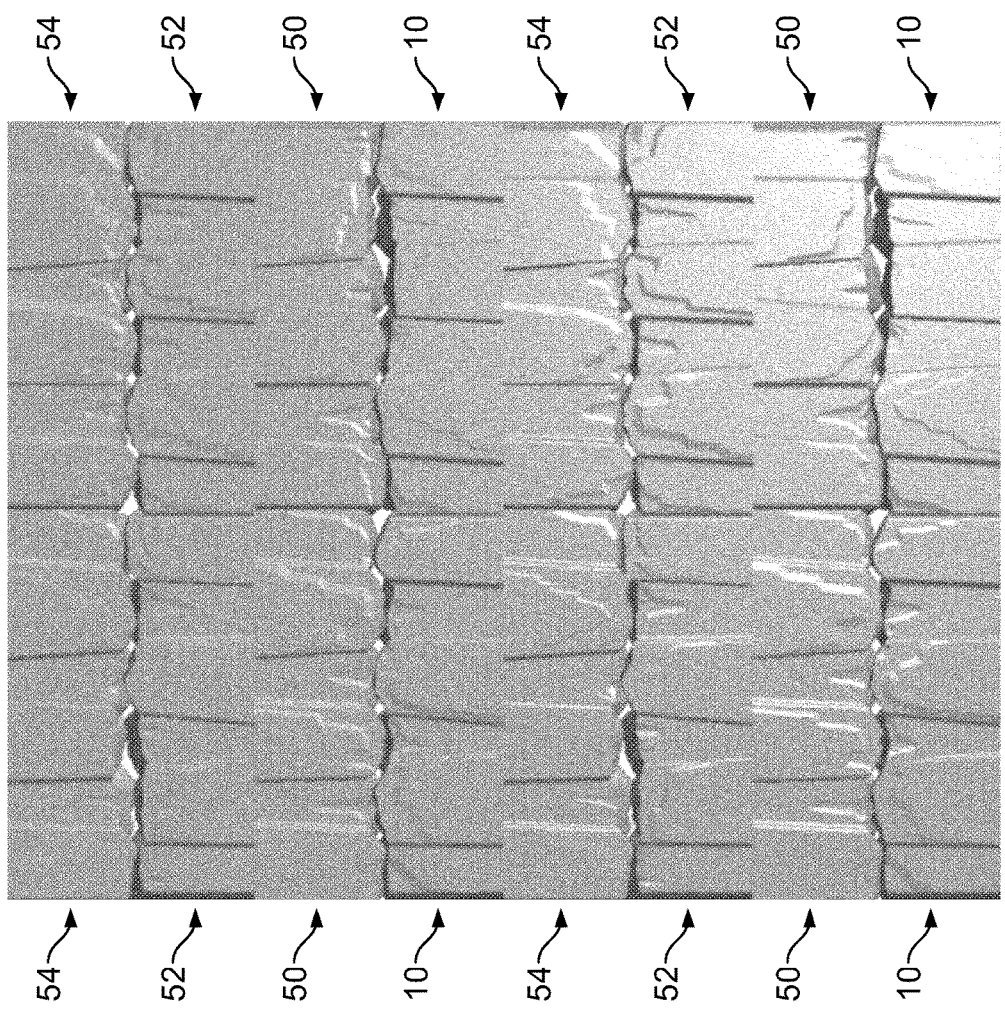
FIG. 4 is a top plan view of a plurality of edging units according to FIGS. 3A-3C laid flat and arranged in an arrayed layout, such as a pallet layout, illustrating nesting between adjacent edging units.
Figure 5C:
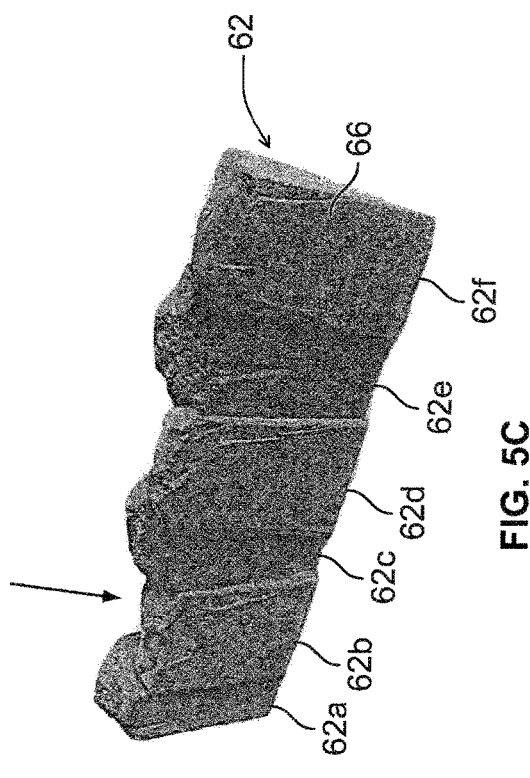
FIGS. 5A-5D are perspective views of edging units according to a fifth embodiment of the invention, respectively, in which selective portions of protrusions of an outer surface are removed.
Figure 5D:
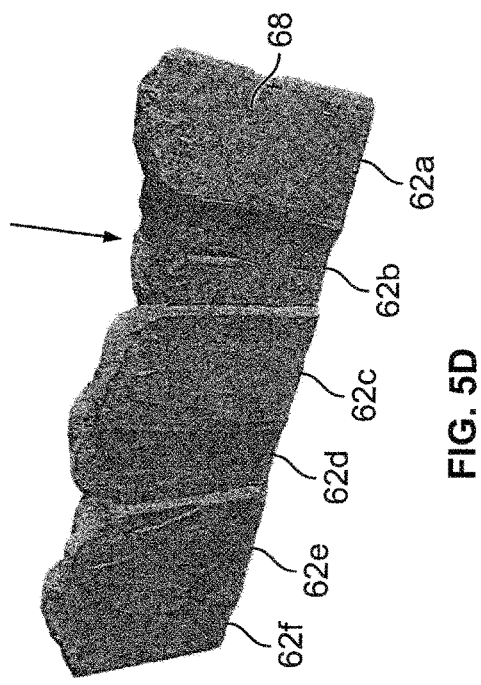
Figure 5A:
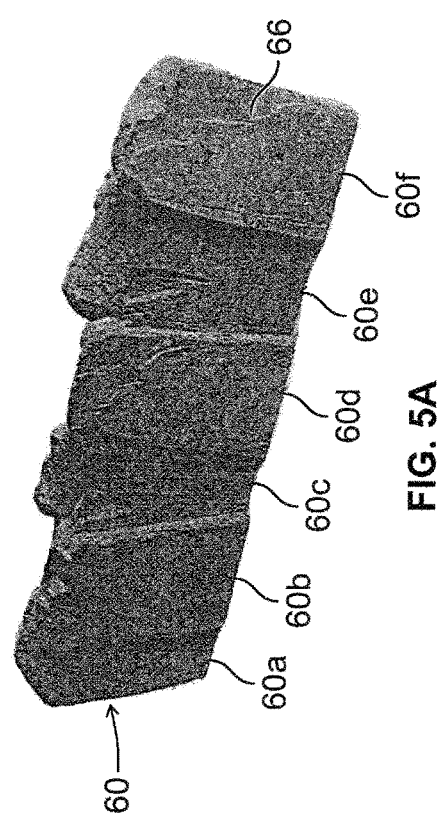
Figure 5B:
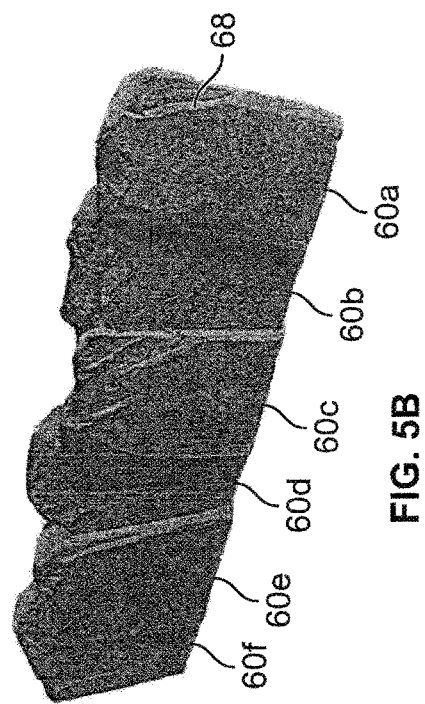
Figure 9:
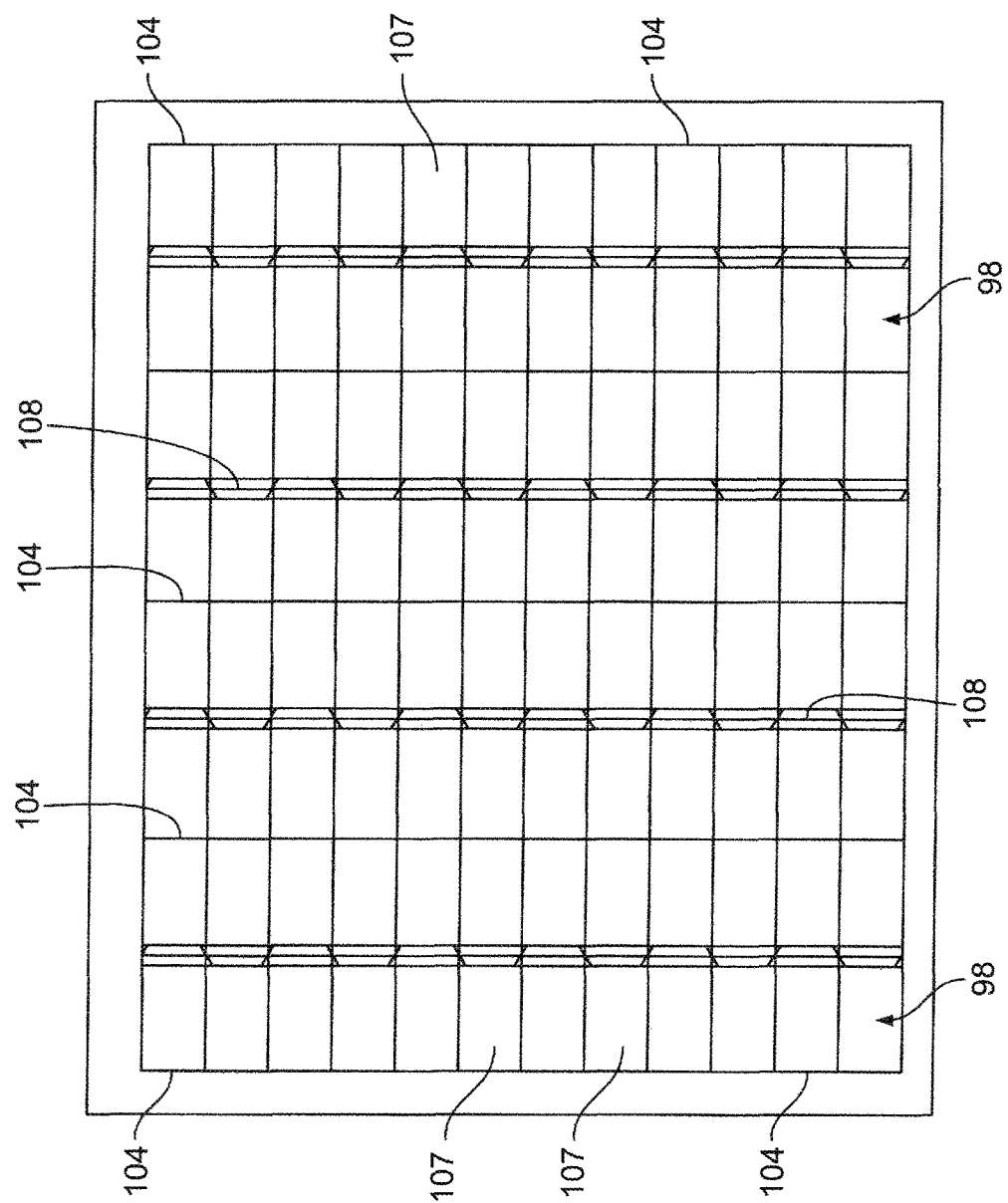
FIG. 9 is a simplified top plan view of a plurality of edging units laid flat and arranged in an arrayed layout on a pallet.

The opposing pairs of segments are generally complementary to one another so that when opposing pairs of like or similar edging units 10 face one another at their top surfaces 12, the top surface segments 12a, 12b, 12c, 12d, 12e, 12f can nest and interlock with one another, as shown by example in FIGS. 4 and 9. When the units 10 interlock with one another (or with similar units), respective units contact one another at one or more lower stacking points 40a, 40b, 40c, 40d, 40e, 40f, upper stacking points 42a, 42b, 42c, 42d, 42e, 42f, and/or intermediate stacking points 44c, 44d (for example) disposed on the upward or downward slopes. The stacking points 40, 42, 44 are provided by surfaces of the edging unit 10 within individual segments, forming all or a selected portion of the overall surface of the segment, and having any shape in plan view, which surfaces are disposed to contact and nest with facing stacking points of a facing like or similar edging unit, whether the facing edging units have the same end-to-end orientation or have respectively reversed end-to-end orientations. Such example configurations allow the edging units 10 to be stacked for manufacture, storage, transport, forming structures, or for other uses, reducing required space, among other benefits. By generally limiting the contact in a normal direction between facing edging units 10 to the stacking points 40, 42, 44 and by limiting shear due to relative shifting (e.g., lateral shifting or vertical shifting) of units during such processes, example edging units reduce undesirable wear on surface details of the edging units.

Figure 1D:
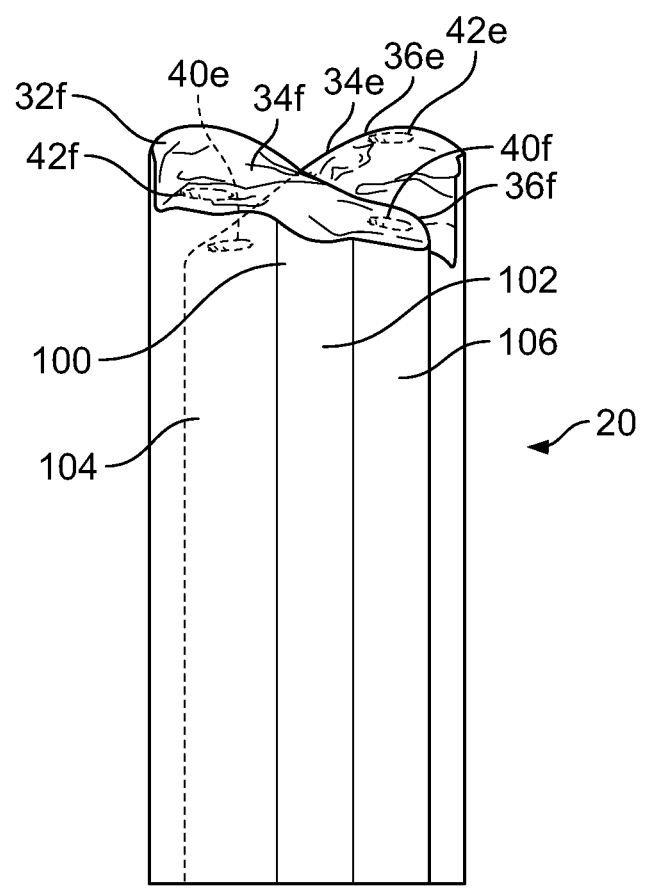

For each top surface segment 12a, 12b, 12c, 12d, 12e, 12f, the upper portion, upward or downward slope, and lower portion need not be, and preferably are not, perfectly flat, smooth, or straight. Each of the top surface segments 12a, 12b, 12c, 12d, 12e, 12f preferably includes irregular contours, surface features, textures, portions that are lowered, roughened, textured, or ablated, etc., or any combination of the above to provide a more natural appearance, provide aesthetic features, etc. For example, FIG. 1D shows a portion of the edging unit 10 near the first end 20. It can be seen that the upper portion 32f is not perfectly flat, but instead has an irregular contour having a portion 42f (i.e., a portion that runs generally parallel to the overall surface). Similarly, the downward slope 34f is not perfectly slanted, but also has an irregular contour. Finally, lower portion 36f is not perfectly flat, but instead has an irregular contour having a portion 40f. The portions 40f, 42f provide example stacking points for facing edging units 10, and are thus referred to herein as upper and lower stacking points, respectively. Similarly, additional stacking points 44c, 44d (and as also shown, e.g., in FIGS. 6A-6C) can be provided on one or more portions of the upward or downward slopes.

Though stacking points 40a-f, 42a-f and 44c-d are shown in FIG. 1, edging units may have fewer or greater numbers of stacking points, in various combinations. For example, one or more of stacking points 40a-f or 42a-f can be omitted in example embodiments. Additional intermediate stacking points (not shown) can be provided on the upward or downward slopes 34a, 34b, 34e, or 34f. To permit mating and nesting of facing stacking points when the edging units 10 face one another, whether in the same or opposite end-to-end orientations, one or more pairs of stacking points are preferably arranged symmetrically with respect to the center 30, as will be explained further below.

Stacking points of facing edging units 10 contact one another when the edging units are stacked, whether or not the facing edging units have the same end-to-end orientation. An upper stacking point from a segment can engage and contact a lower stacking point from either the same segment or from the opposing paired segment of a facing edging unit 10, and vice versa. For example, upper stacking point 42a can engage and contact lower stacking point 40a when facing edging units have the same end-to-end orientation, or engage and contact lower stacking point 40f when facing edging units 10 have the opposite end-to-end orientation. Similarly, upper stacking point 42b can engage and contact lower stacking point 40b or lower stacking point 40e. As another example, lower stacking point 40a can engage and contact upper stacking point 42a or upper stacking point 42f. Intermediate contact points, e.g., contact point 44c, preferably contact a symmetrically disposed intermediate contact point on the opposing segment of the pair (e.g., contact point 44d).

It is not required for all contact points 40, 42, 44 to have a mating or nesting contact point on a facing edging unit. For example, one or more of the contact points 40a-f, 42a-f, 44c-d (or other intermediate contact points) can be omitted (e.g., by removing material or lowering a segment) without its counterpart stacking point being omitted. A single pair of contact points may be provided. Preferably, two or more pairs of symmetrical contact points are provided on the edging unit 10 to provide for contact whether the edging units are or are not reversed in end-to-end orientation. In this way, the top surfaces 12 of facing edging units 10 preferably do not engage one another at all parts of the surfaces, but preferably only at their respective contact points 40, 42, 44.

FIGS. 2A and 2B show enlarged portions of the ends 22, 20, further illustrating example irregular features of the top surface segments 12a, 12f. It can be seen that even though the top surface segment 12a generally slopes upward (from bottom to top of the page) and the top surface segment 12f generally slope downward, the contours are irregular. Lower contact points 40a, 40f and upper contact points 42a, 42f are shown, which can be embodied in relatively flat surfaces or in complementary convex and concave surfaces. Because segments 12a and 12f form part of an opposed pair of segments, each of lower contact points 40a and 40f can engage both upper contact points 42a and 42f, depending on the end-to-end orientation of a facing edging unit 10. As shown elsewhere herein, pairs of stacking points may alternatively or additionally be provided on the upward or downward slopes, and/or on other pairs of opposed segments, in any combination.

Figure 3A:
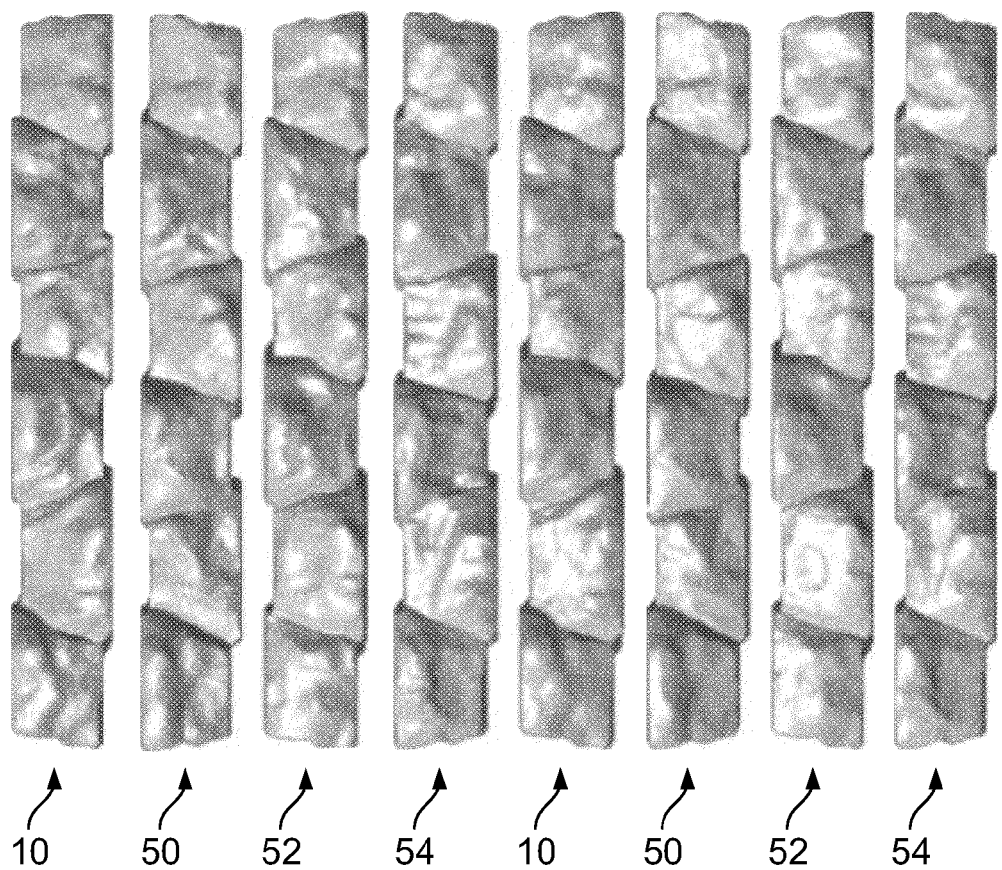
FIGS. 3A-3C are top plan, perspective, and end elevation views, respectively, of a plurality of arranged edging units according to first, second, third, and fourth embodiments.
Figure 3B:
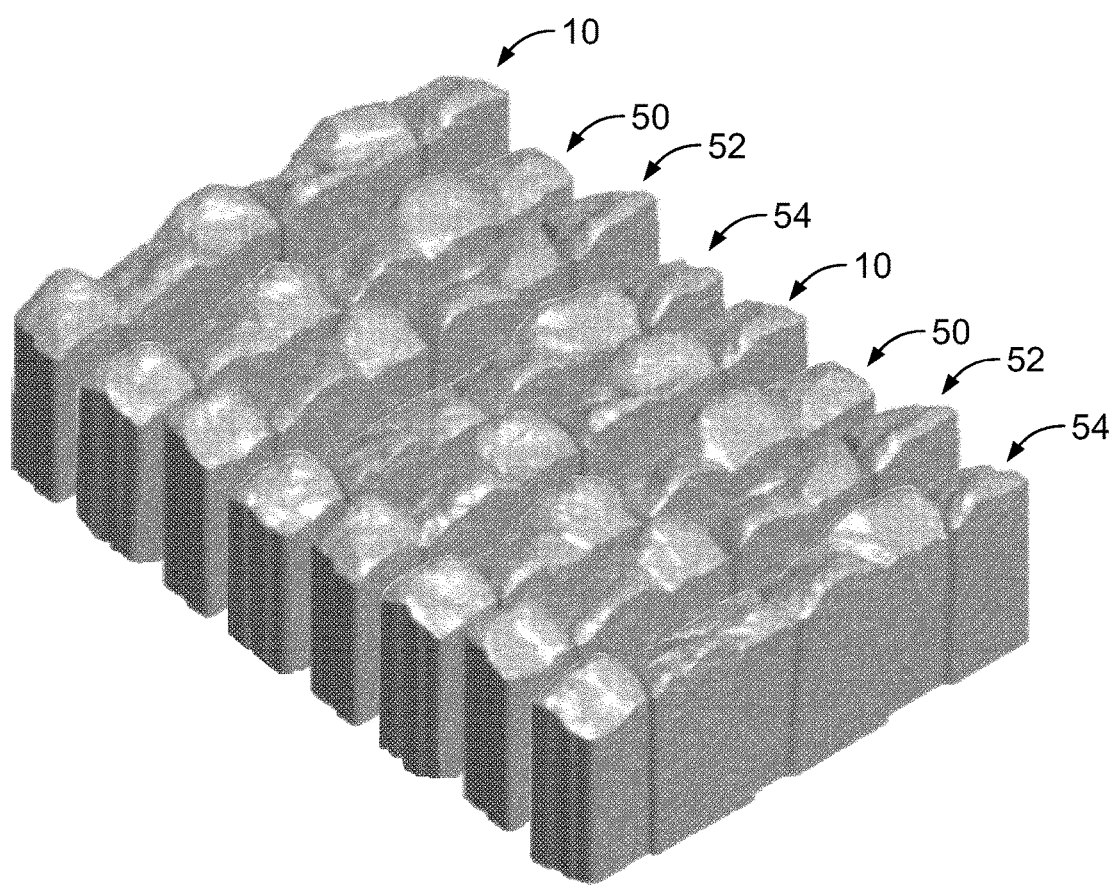
Figure 3C:
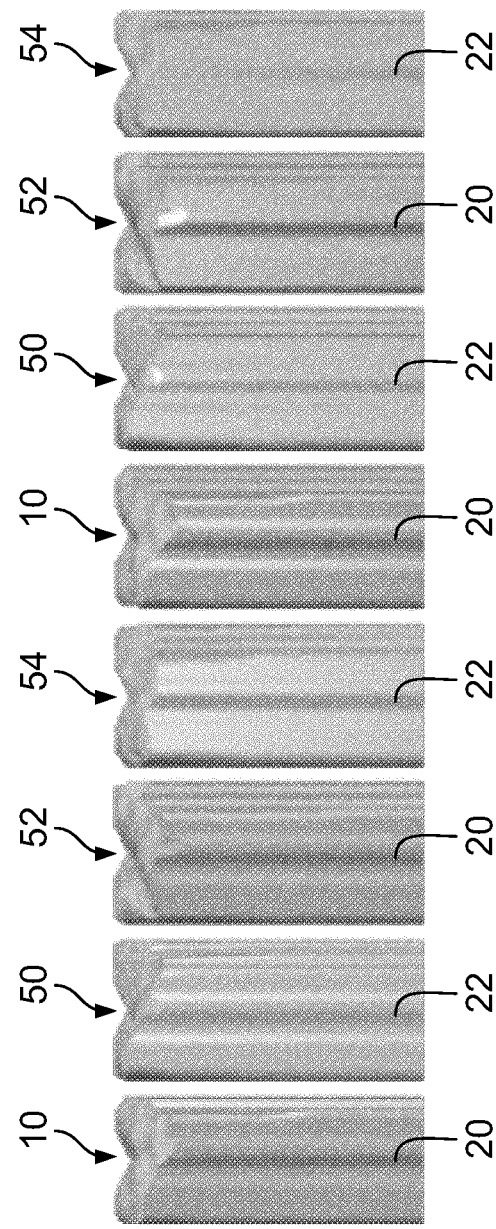

FIGS. 3A, 3B, and 3C show an example layout of arranged edging units 10 along with addition edging units 50, 52, 54. The edging units 50, 52, 54, have a similar overall configuration to the edging unit 10, but can vary in the direction of the first and second ends 20, 22, and by selected features such as but not limited to configuration of offsets between segments, configurations of false joints between segments, spanning segments, and/or within segments, slopes of top surface segments, configurations of areas surrounding stacking points, removed or lowered portions, slopes or gaps (e.g., top to bottom), configuration of side surfaces (including shapes, textures, etc.), and in other ways. However, each of the edging units 10, 50, 52, 54 have top surfaces 12 that nest with one another for stacking, such as shown by example in FIG. 4 (the bottom surfaces 14 of the edging units, which preferably are flat, can fully contact one another during this arrangement, though this is not required in all embodiments).

Example materials for edging units include known edger materials, including concrete (wet or dry cast), fired clay, plastic, fiberglass, composites, or other materials. Edging units can vary in many ways, including any and all combinations of variations disclosed herein. For example, the top surface segments 12a, 12b, 12c, 12d, 12e, 12f can be shaped in rectangular, trapezoidal, orthogonal, circular, oval, obround, etc., as well as irregular, in plan view. The plan view orientation of segments can alternate, such as shown by the alternating trapezoids 12a, 12b, 12c, 12d, 12e, 12f. Shapes can be provided by addition and/or removal of material. Segments of the first side surfaces 16a, 16b, 16c, 16d, 16e, 16f or the second side surface 18a, 18b, 18c, 18d, 18e, 18f can be generally rectangular, arched, orthogonal, trapezoidal, polygonal, etc., and can also be irregular. As mentioned above, the edging units can be further varied and/or made more natural looking or aesthetically pleasing by providing lowered, roughened, textured, or ablated portions, removing or even adding material.

FIGS. 5A-5D show two additional embodiment edging unit 60, 62, having segments 60a-f and 62a-f. The segments are generally irregular as viewed along first and second side surfaces 66, 68. Further, segments 60b/62b, 60d/62d, 60f/62f are drafted out on one side, and segments 60a/62a, 60c/62c, 60e/62e are drafted out on the opposite side to provide alternately offset segments, as will be discussed further below. As shown in FIGS. 5A-5D, the edging units 60, 62 each have a textured, more rock-like appearance. Further, on the edging unit 62 (FIGS. 5C-5D, a portion of the segment 62b is removed, as indicated by an arrow in the figure, providing a lowered portion of this individual segment. Preferably, this particular material removal is unique to the segment 62b, and appears random, to further promote a natural appearance. Of course, portions of other segments can be removed additionally or alternatively to provide lowered portions. Any of the surfaces can be textured and/or provided with an irregular shape to provide a more natural appearance. Lowering a portion of a segment can eliminate one or more stacking points for that segment, but need not in all embodiments.

FIGS. 6A-6F show top surfaces of other example edging unit variations to illustrate how stacking points and segments can be varied. For clarity of explanation, these views have been simplified. FIG. 6A shows a top surface of an edging unit 64 having four segments 64a, 64b, 64c, 64d in two opposed pairs, inner pair 64b and 64c, and outer pair 64a and 64d. Each of the inner pair of segments 64b, 64c includes stacking point 44b, 44c on adjacent, oppositely sloped portions, while each of the outer pair of segments 64a, 64d includes upper and lower stacking points 40a, 40d, 42a, 42d. As shown in FIG. 6A, given upper and lower stacking points from two opposed segments in a pair, i.e., 42a and 40f, and 40a and 42f, and 44b and 44c, each are laterally (in the end-to-end direction) equidistant from the center 30; that is, equidistant from a front-to-back axis extending through the center (shown as a vertical axis in the orientation of FIG. 1A). Further, each upper and lower stacking point in the same segment, i.e., 42a and 40a, and those in the opposed segment of that pair, 42f and 40f, are equidistant along the front-to-back direction from a longitudinal (end-to-end) axis of the unit extending through the center 30 of the edging unit 64 (shown as a horizontal axis in the orientation shown in FIG. 1A). Intermediate stacking points 44c, 44d are also disposed symmetrically relative to the horizontal and vertical axes extending through the center 30. In this way, both upper stacking points 42a and 42f can nest with either lower stacking point 40a or 40f when the top surfaces of the edging units 64 are turned to face another, with the particular nesting pair depending on the edging units' respective end-to-end orientation. Further, intermediate stacking points 44c, 44d can nest with themselves or with each other, depending on the facing edging units' respective end-to-end orientation. Intermediate stacking points can additionally or alternatively be provided on segments 64a and 64d in some embodiments. However, is it to be understood that while stacking points of segments in a first opposed pair can be disposed symmetrically as described above with respect to the first pair of segments, and while stacking points of a second opposed pair of segments can be disposed symmetrically as described above with respect to the second pair of segments, stacking points in the first pair of segments need not be symmetrical with those in the second pair of segments. For example, as shown in FIG. 1A, while stacking points 42a, 40a, 42f, 40f are arranged symmetrically with respect to segments 10a and 10b, and while stacking points 40b, 42b, 40e, 42e are arranged symmetrically with respect to segments 10b and 10e, it is not necessary that stacking points in segment 10a or 10f be symmetrical with those of segments 10b or 10e (though they can be if desired).

FIG. 6B shows a top surface having four segments 66a, 66b, 66c, 66d, with the inner pair of segments 66b, 66c having side surfaces 68, 70 that are angled in plan view with respect to those of the outer pair of segments 66a, 66d. The outer pair of segments 66a, 66d, include stacking points 40a, 42a, 40d, 42d, and the inner pair of segments 66b, 66c include stacking points 44b, 44c. Even though the segments 66b, 66c are angled, the stacking points of facing edging units can nest with one another, even when the edging units are reversed in end-to-end orientation. In FIG. 6C, the top surface includes six segments 72a, 72b, 72c, 72d, 72e, 72f, in which the inner pair of segments 72c, 72d include stacking points 44c, 44d, and the outermost pair of segments 72a, 72f including lower and upper stacking points 40a, 40f, 42a, 42f. However, the next inner pair of segments 72b, 72d do not include stacking points (and thus mating edging units would typically not contact one another within these segments).

FIGS. 6D-6F show top surfaces of additional edging units to illustrate varying widths of segment pairs. The edging unit of FIG. 6D includes a top surface having segments 76a, 76b, 76c, 76. Each of an inner opposed pair of segments 76b, 76c has a greater width than each of an outer opposed pair of segments 76a, 76d. Edging units with segments 76a, 76b, 76c, 76d still can nest and connect with a facing like edging unit. Similarly, FIG. 6E shows a top surface of an edging unit having segments 78a, 78b, 78c, 78d, in which each of an inner opposed pair of segments 78b, 78c has a greater width than each of an outer opposed pair of segments 78a, 78d. FIG. 6F shows a top surface of an edging unit having six segments, 80a, 80b, 80c, 80d, 80e, and 80f. In this example edging unit, an inner opposed pair of segments 80c, 80d has a width (e.g., 2.875") that is narrower than each of a next outer pair of segments 80b, 80e (e.g., 3.125"). Further, each of the outermost pair of segments 80a, 80f has a width (e.g., 3") that is greater than that of the innermost pair of segments 80c, 80d, but smaller than that of the next outer pair of segments 80b, 80c. Again, stacking points of an edging unit having such varied width pairs of segments positioned as disclosed herein still can nest and connect with stacking points of a facing like edging unit. All variations of segments, stacking points, widths, are contemplated herein, and in each such configuration, the segments of facing edging units can be reversed in end-to-end orientation or remain in the same end-to-end orientation and still connect at respective stacking points.

Figure 7B:
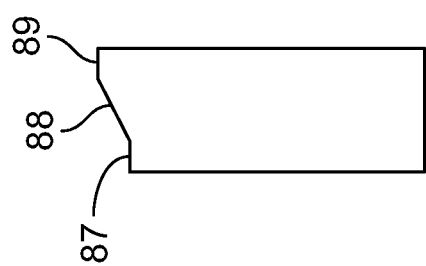
Figure 7A:
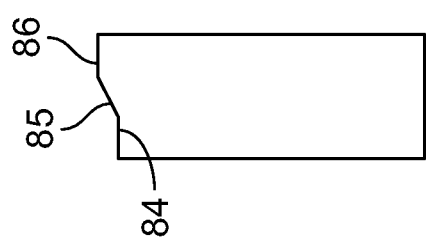

Other example embodiment edging units vary in the general profile of the top surface segments (that is, in addition to added or removed features providing an irregular or more natural surface, or to define particular stacking points). For example, angles of the upward or downward slopes (e.g., slope 34a in FIG. 1A) can vary. As another example, the relative area of the lower surface or upper surface (e.g., surface 32a and 36a in FIG. 1A), as established by a front-to-back length, can be varied. FIGS. 7A-7B and FIGS. 8A-8B show example variations for a general top surface contour. FIG. 7A shows a general profile for a top surface segment having a lower surface 84 with a relatively large front-to-back length, a relatively flat upward or downward slope 85, and an upper surface 86 having a relatively large front-to-back length, resulting in a relative small vertical distance between the upper surface and the lower surface. FIG. 7B shows a general profile for a top surface segment including a lower surface 87 having a relatively smaller front-to-back width, a slope 88 having a similar angle to that of slope 85 but a greater width, and an upper surface 89 having a relatively smaller front-to-back length, providing a larger vertical distance between the upper surface and the lower surface than that of FIG. 7A.

Figure 8B:
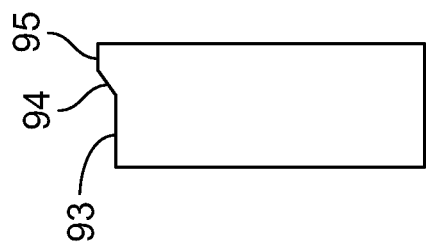
FIGS. 7A-7B and 8A-8B are simplified end views of edging units according to ninth, tenth, eleventh, and twelfth embodiments of the invention, illustrating example top surface profiles.
Figure 8A:
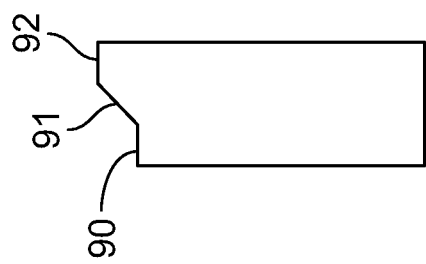

FIG. 8A shows a general profile for a top surface segment having a relatively larger lower surface 90 and upper surface 92, but a slope 90 having a greater angle than that of slopes 85, 88. FIG. 8B shows a general profile for a top surface having a relatively large lower surface 93, a relatively small but sharply angled slope 94, and a small top surface 95. This provides an asymmetrical top surface in plan view, which alone permits sliding between facing units, though it can be combined with top surface profiles that inhibit sliding as well. It is preferred, but not required, that for opposing pairs of segments, the general profile be substantially similar for both segments in a pair to better facilitate nesting (though such segments can still differ due to selected removed or added features as explained herein, while providing stacking points that can nest with one another). It will also be appreciated that transitions between the lower surface, slope, and the upper surface need not be as sharp (i.e., have a small radius) as those shown in FIGS. 7A-7B and 8A-8B. As shown in FIG. 1D, for example, a radius (e.g., convexity or concavity) between such portions of the top surface can be significantly larger to provide a more rounded, natural transition. Variations can be provided by lowering or removal (e.g., sculpting), molding, or other fabrication techniques as will be appreciated by those of ordinary skill in the art. Stacking points (not shown) can be provided on such example surfaces on lower, upper, or sloped surfaces in any of various combinations as disclosed elsewhere herein.

Referring again to FIG. 1D and FIGS. 2A-2B, for facilitating end-to-end connection of adjacent edging units 10, each of the first and second end surfaces 20, 22 preferably has a profile including a concave or inwardly extending portion and a convex or outwardly extending portion to define a general S-shape connection surface for engaging other surfaces of additional edging units. For example, end surface 20 (FIGS. 1D and 2B) includes a subtle (front) concave portion 100 gently transitioning to a subtle (rear) convex portion 102. "Front" and "rear" are used with respect to the orientation of the edging unit 10 shown in FIG. 1A. Outer portions 104, 106 are preferably relatively flatter, but may include curved features in some embodiments. In the example end surface 20, the front outer portion 104 extends along the end surface for a greater length than does the rear outer portion 106. This example S-shaped connection surface can be considered a center rotation, in that the profile of a rear portion (portions 106, 102) can rotate about a center 108 of the S-connection (i.e., the center between the concave and convex portions 100, 102) to mate with the profile of a front portion (portions 100, 104). Similarly, the end surface 22, best viewed in FIG. 2A, includes a subtle (front) convex portion 110 gently transitioning to a subtle (rear) concave portion 112. Outer portions 114, 116 again are preferably flatter, but can include curves. In the end surface 22, the profile of a front portion (portions 114, 110) can rotate about a center 118 (i.e., the center between convex portion 110 and concave portion 112) to mate with the profile of a rear portion (portions 112, 116). In the example end surface 22, the rear outer portion 116 extends along the end surface for a slightly greater length than does the front outer portion 114.

Preferably, rear outer portion 116 of the second end surface 22 extends for a similar length as the front outer portion 104 of first end surface 20, and the front outer portion 114 of the second end surface 22 extends for a similar length as the rear outer portion 106 of the first end surface. This creates equal offsets for each of the centers 108, 118 of the S-connection with respect to the true center of the end surfaces 20, 22. For example, the center 108 is slightly rearward from the true center of the end surface 20, while the center 118 is slightly frontward from the true center of the end surface 22. However, both center 108 and center 118 are disposed along the end-to-end (horizontal) axis extending through center 30 in FIG. 1A, which is coextensive with the horizontal dashed line shown in FIGS. 2A and 2B.

The profile of this example S-shaped connection can generally be considered a center rotation about center 118. Further, the profile of the S-shaped connection of end surface 22 is a rotation (flipped) of the profile of the S-shaped connection of end surface 20. The end surfaces 20, 22 also are angled similar or identically with respect to the front-to-back direction. In this way, end surfaces 20, 22 of like edging units 10 nest with one another when adjacent edging units 10 with the same front-to-back orientation face one another. The example end surfaces 20, 22 are also oriented at opposite angles to one another, so that end-to-end connected edging units 10 align along a straight line when they are reversed in respective front-to-back (i.e., first side surface to second side surface) orientation with respect to one another. As further explained below, the front-to-back offset defined by the relative positions of the centers 108, 118 within the individual segments allows an offset front-to-back connection between adjacent edging units. As a result, segments of connected ends of edging units will always offset with respect to one another, whether the edging units are the same end-to-end orientation or reversed in end-to-end orientation.

FIG. 9 shows an example pallet arrangement for edging units 98, showing two rows of eight edging units. Each example edging unit 98 has six segments 106, top surfaces 107 of which are stacked and nested together, interlocking along their top surfaces and on their respective ends. This and other interlocking arrangements reduce required space for manufacture, storage, shipping, etc., and reduces undesirable shifting between units.

Figure 10:
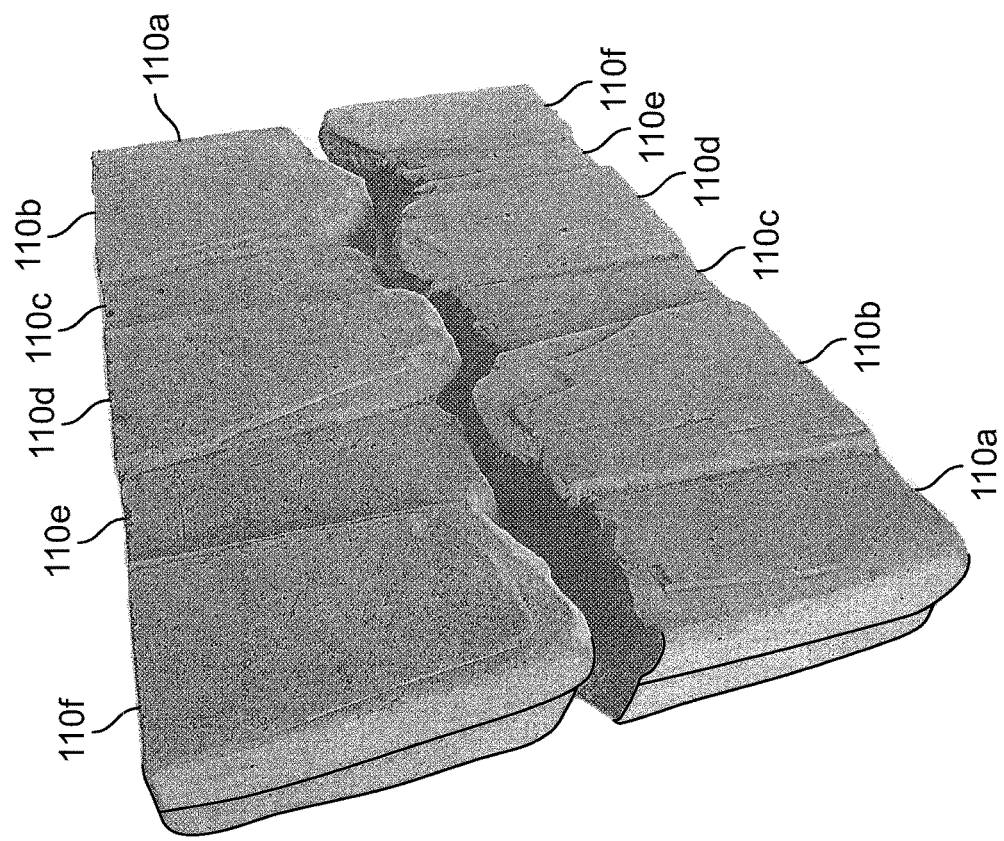
FIG. 10 is a perspective view of two edging units in a facing arrangement, illustrating nesting top surfaces.

To further illustrate the nesting connection of the top surfaces, FIG. 10 shows a pair of textured, generally stone-like edging units 110. The edging units 110 face one another, e.g. approaching a stacking position, so that the complementary top surfaces of segments 110a, 110b, 110c, 110d, 110e, 110f nest with one another. The top surface of each segment 110a, 110b, 110c, 110d, 110e, 110f alternately slopes up or down (in a standing orientation). As explained above, this nesting connection preferably does not result in contact between all portions of the top surfaces of segments 110a, 110b, 110c, 110d, 110e, 110f, but instead due to deliberate surface features (addition and/or removal) contact preferably is made only at particular stacking points along the top surface. Slight contact can be provided, and contact points can be made along any point of the body of the edging units. This provides more natural looking, aesthetically pleasing combinations.

FIGS. 11A-11F illustrate example offset S-connections between ends of example edging units. Consider three surface profiles having S-connections with ends A, B, and C. End A includes an S-connection having a convex surface 120 transitioning through a center to a concave surface 121, where the S-connection is centered with respect to a center (front-to-back direction) of the edging unit (e.g., the horizontal axis extending through center 30 in FIG. 1A). End A also includes equally sized outer portions 122. End B includes an S-connection that is also centered with respect to a center of the edging unit, but includes equally sized outer portions 124 of smaller length than that of End A. End S includes an S-connection that is offset by an offset distance with respect to a (front-to-back) center of the edging unit, with one outer portion 126 being longer by the offset distance than that of the other outer portion 128.

FIG. 11A shows a connection of end A to end B. Though end B includes shorter outer portions 124, the connection with end A provides a straight alignment. Similarly, connections of end B to a reverse end B (e.g., where one of the edging units is reversed in orientation) (FIG. 11B), and connections of end A to a reverse end A (FIG. 11C) provide a straight alignment. By contrast, when end S connects with reversed end A (FIG. 11D), with end B (FIG. 11F), or with a reversed end S (FIG. 11E), the alignment of the edging units is offset by the offset distance, as most clearly viewed using the circles shown in FIGS. 11D-11F.

FIGS. 12A-12B show an edger unit 130 having end surfaces 132, 134, each having S-connection surfaces with a profile similar to the profile shown in the S-connection surfaces in FIGS. 2A and 2B, respectively. As shown in FIGS. 12A and 12B, the S-connection surface of end surface 132 has an angled (with respect to the front-to-back direction) end similar to end S as shown in FIGS. 11D-11F. S-connection surface of end surface 134 is a reverse rotation of the S-connection of end surface 132, and has an angle (with respect to the front-to-back direction) that is generally opposite to that of end surface 132. FIG. 12B shows the two end surfaces 132, 134 adjacent to one another, with the intermediate portion of the edging unit 130 removed for clarity. As shown, even though the centers 136 of the respective S-connections are aligned, e.g., aligned with a center of the unit, an offset connection is provided for each S-connection, as illustrated by the circles in FIG. 12B.

Alone or in combination with such example offset connections, the segments, e.g., segments 10a, 10b, 10c, 10d, 10e, 10f, 10g (best viewed in FIG. 1A), can be alternately offset from one another in plan view by an offset distance. These offsets can define lateral gaps between outer portions of alternate segments. It is possible that lateral gaps are provided on some outer portions between alternate segments, but not between other portions of the same alternate segments (for instance, if portions of side surface 16, 18 features partially overlap adjacent segments, such as when side surfaces are partially drafted, or in other ways which will be apparent).

Figure 15A:
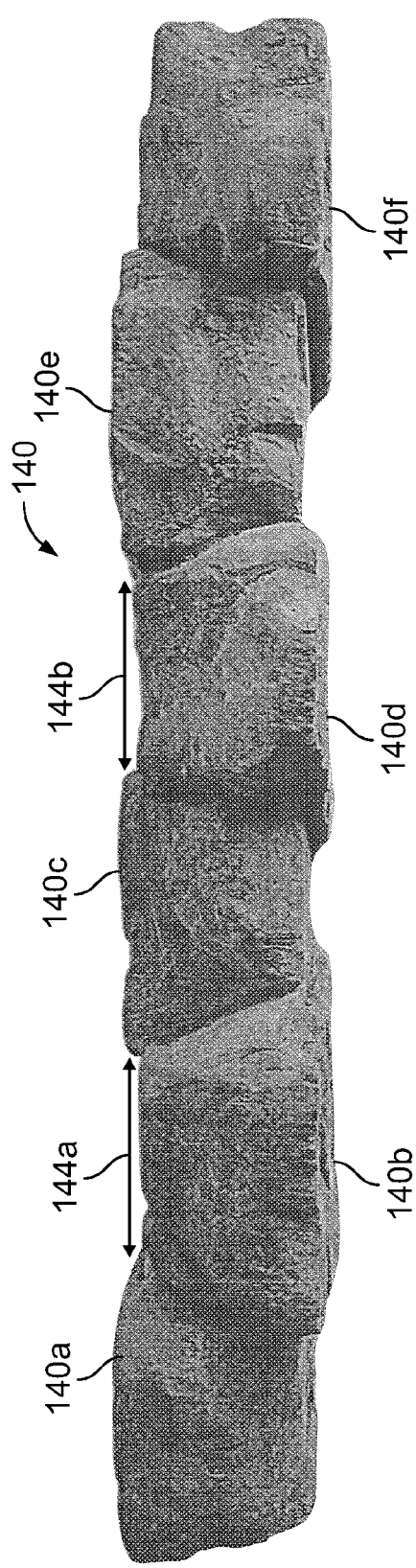
FIGS. 15A-15B are top and bottom plan views, respectively, of an edging unit according to a thirteenth embodiment of the invention.
Figure 15B:
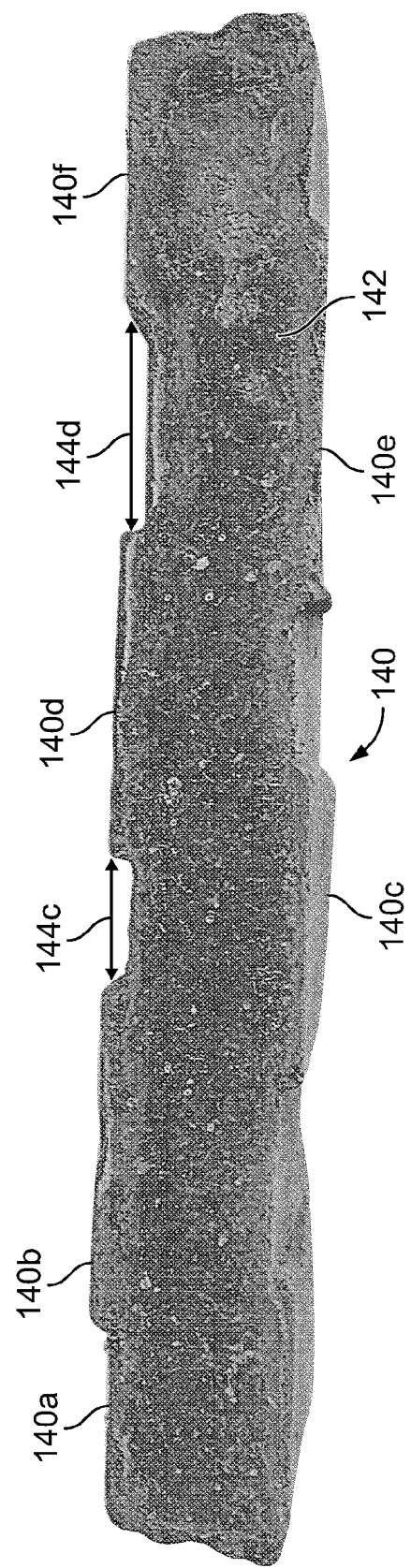

For example, FIGS. 15A-15B shows an edging unit 140 having six segments 140a, 140b, 140c, 140d, 140e, 140f. Alternate segments, i.e., (odd) segments 140a, 140c, 140e, are each offset (e.g., the centers of the segments are offset) in plan view along the front-to-back direction than the (even) alternate segments 140b, 140d, 140f by a front-to-back offset distance. These segments and the offset are also viewable in plan view from the bottom surface 142, though along this surface the segments 140a-f are undivided. The offset between the odd and even segments defines lateral gaps 144a, 144b between outer portions of odd segments 140a and 140c, and between 140c and 140e, respectively. Similarly, as best viewed in FIG. 15B, the offset defines lateral gaps 144c, 144d between outer portions of even segments 140b and 140d, and between 140d and 140f, respectively.

The offsets provided by the segments can operate in combination with the offsets provided by the S-connections at the end surfaces to provide end-to-end connected edging units having continuously alternating segments, with both units remaining aligned. For example, in FIGS. 12A-12B, the segment having end 132 is offset towards the second side of the edging unit (higher in the figures) with respect to the center of the edging unit 136, while the surface profile of the end 132 provides a connection within the segment that is offset towards the first side by the same amount, so that the center of the connection is again aligned with the center 136. Similarly, while the segment having end 134 is offset towards the first side of the edging unit (lower in the figures) with respect to the center 136 of the edging unit, the surface profile of end 134 provides a connection within the segment that is offset towards the second side by the same amount, so that the center of the connection is again aligned with the center 136.

Figure 13:
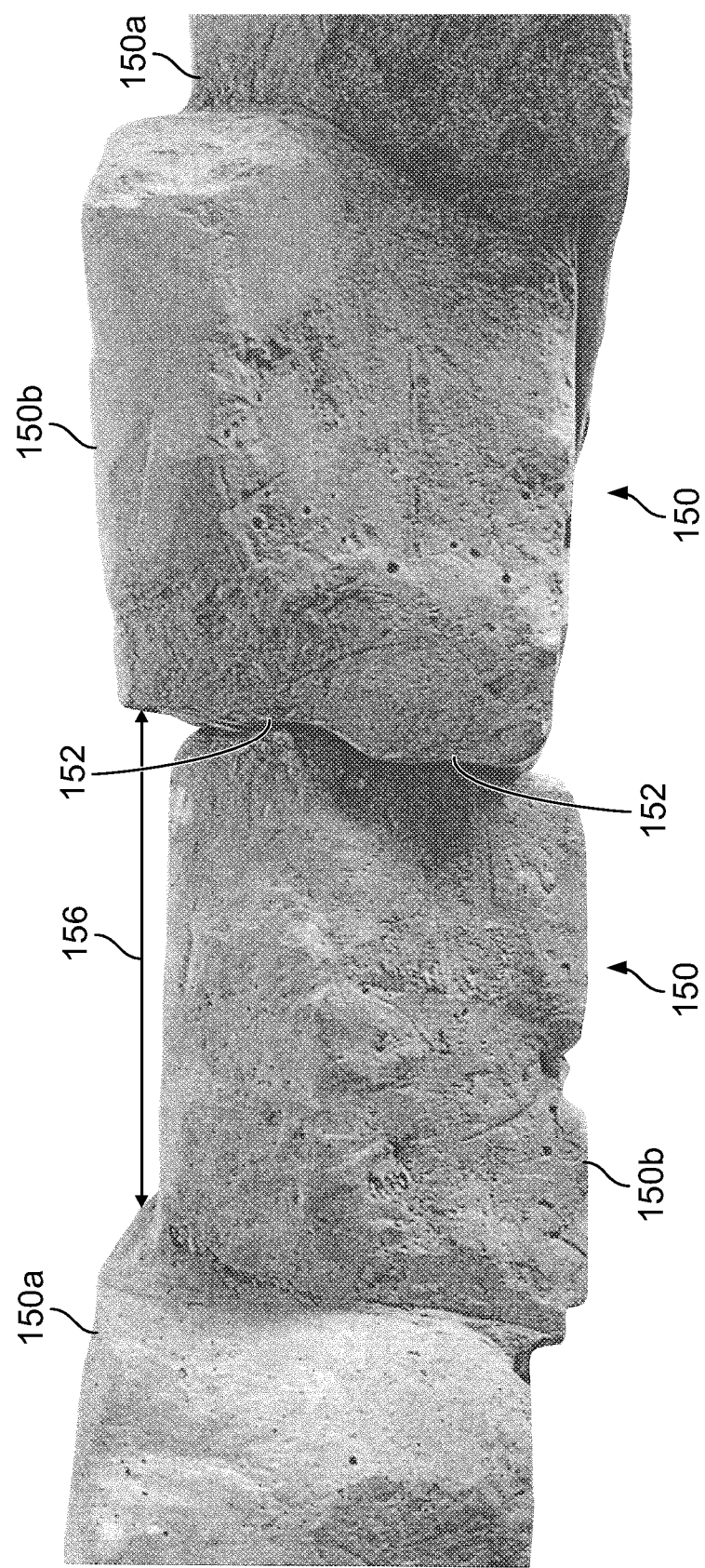
FIG. 13 is a top plan view of a portion of two edging units in a straight alignment and connected.

FIG. 13 shows ends of two joined ends of two like edging units 150 including segments 150a and 150b. A first end surface 152 of the edging unit 150 has an end similar to end S as explained above. The first end surface 152 is angled, and one of the edging units 150 is reversed in orientation with respect to the other edging unit. The units 150 are aligned during connection.

In the connected edging units 150, the connected segments 150b are reversed in orientation with respect to one another, which also reverses the offset direction between segments, so that, in plan view, the segment 150b on the left edging unit 150 is relatively lower, and the (reversed) connected segment 150b on the right edging unit 150 is relatively higher. The same situation occurs when one end segment of one edging unit is connected to an opposing end of an adjacent segment in the same orientation, if the outer pairs of segments are respectively offset from one another (such as when the end connections are straight instead of angled). Without an offset connection provided between units, the front-to-back centers of the connected units can become misaligned (for instance, referring to FIG. 13, the next lower segment 150a on the right edging unit, and all alternating segments thereafter, would be lower in plan view than all of the lower segments 150a of the left edging unit). This creates a cascading or stair-step effect for linearly connected edging units.

As explained above with respect to FIG. 12B, the offset connection provided by end surfaces 132 and 134 (and other end surfaces disclosed herein, such as end surfaces 20, 22) counters an offset provided by adjacent segments so that the centers of both connected edging units remain aligned. Similarly, in FIG. 13, the offset connection provided by the connected first end surfaces 152 counters the offset between connected segments (both 150b), defining a lateral gap 156 between segment 150a of one edging unit and segment 150b of the connected edging unit. Preferably, the offset provided by the offset connection may be substantially equal to (that is, providing for natural or intentional variations) the offset between alternate segments of each edging unit. With this example edging unit configuration, even when offset "high" segments are connected to offset "low" segments in a linear alignment, the combined units provide a continuously alternating array of segments along both (or more) edging units, while all edging units can be aligned along a single axis.

Figure 14:
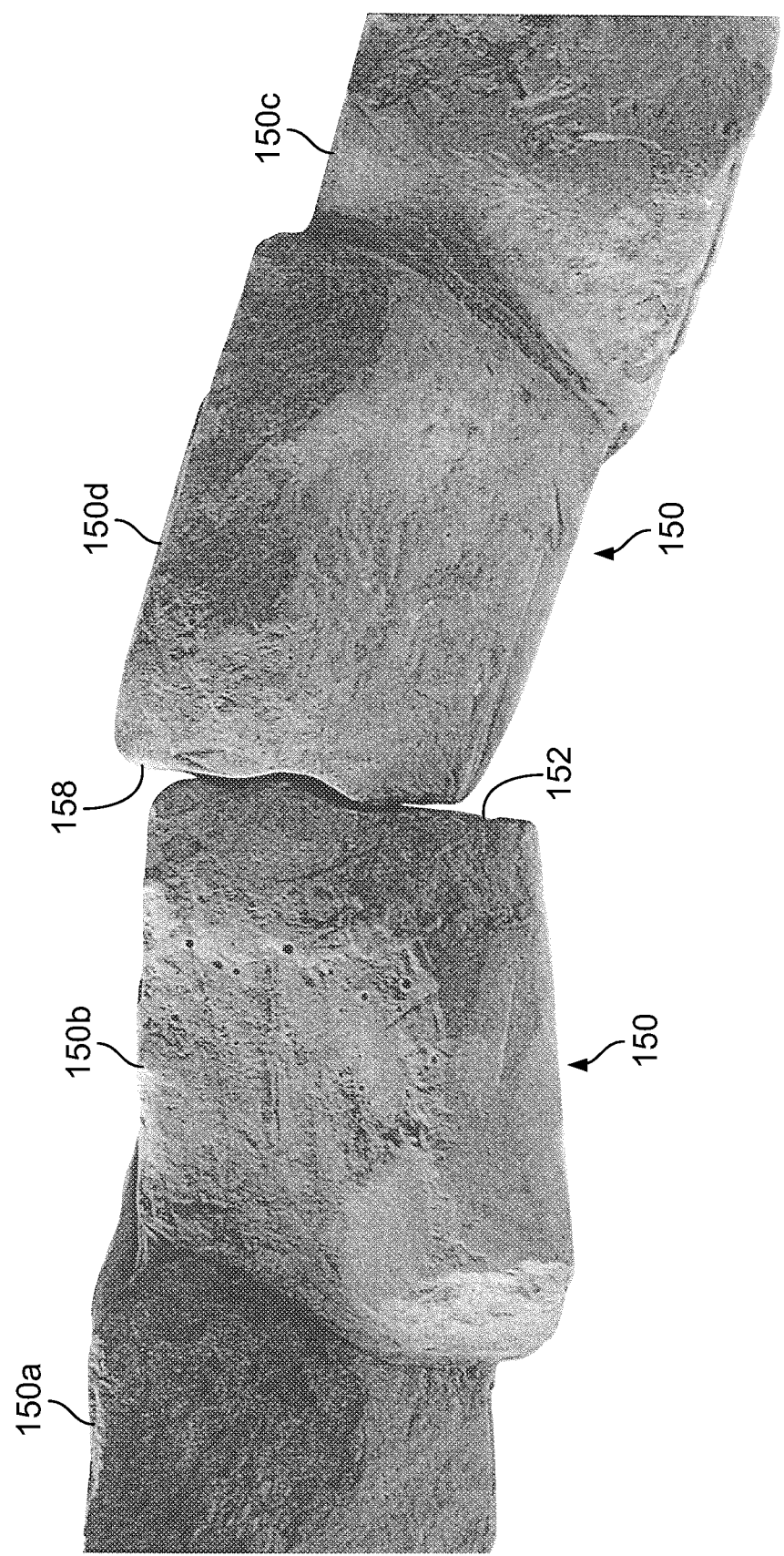
FIG. 14 is a top plan view of a portion of two edging units in an angled alignment and connected.

FIG. 14 shows connected edging units 150 where both are connected end-to-end in the same orientation. Particularly, the first end surface 152 of one unit is connected to a second end surface 158 of an adjacent unit. The angle of both end surfaces 152, 158 results in an angled alignment of the connected edging units 150. Further, the offset provided by the S-connections of both end surface 152, 158 offsets segment 150b of one edging unit with an opposing end segment 150d of an adjacent end unit. Again, this provides a continuous alternating sequence of segments across multiple connected units.

Figure 16A:
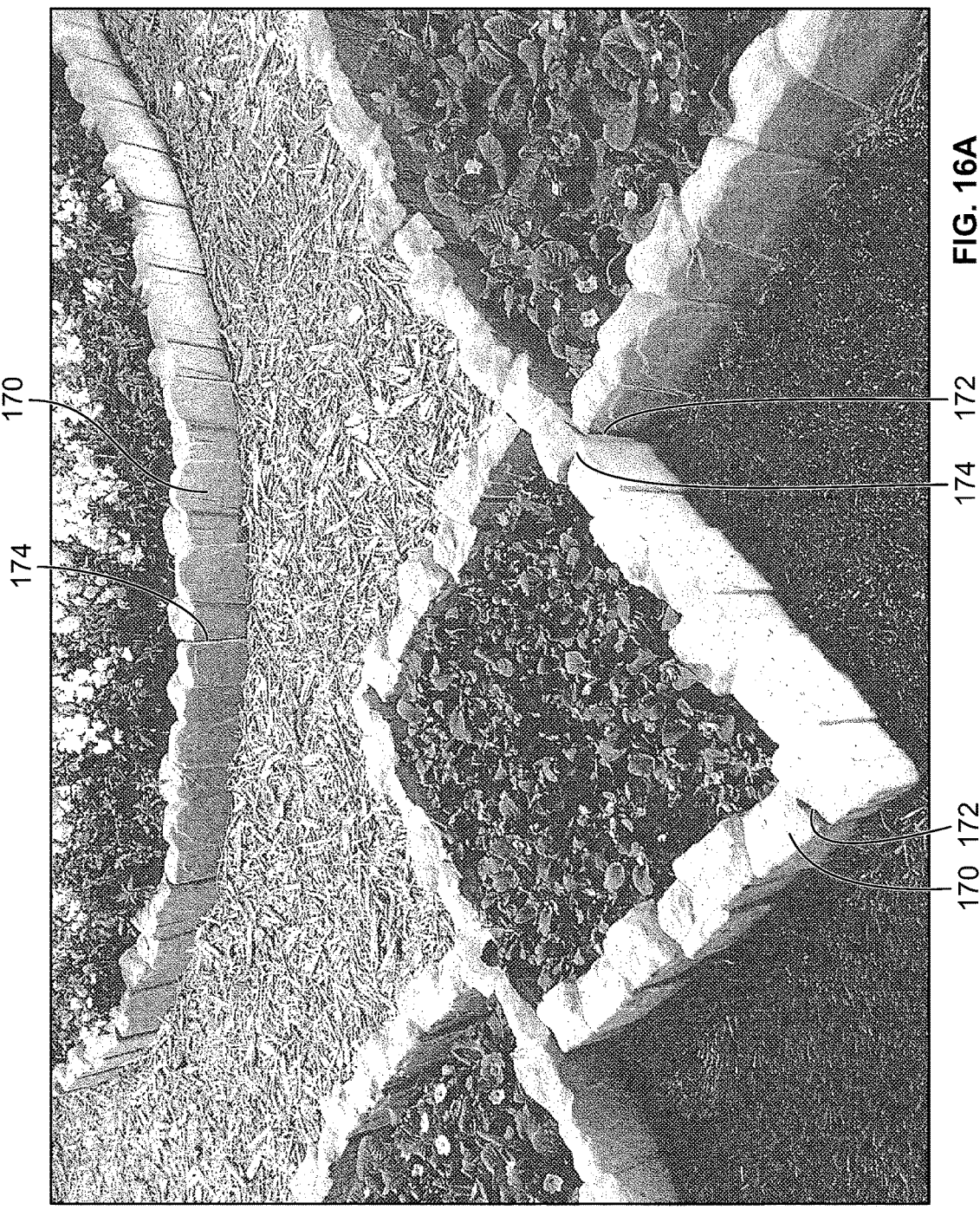
FIGS. 16A-16C are perspective view of textured edging units arranged to provide first, second, and third example edging systems respectively, illustrating various arrangements and connections between edging units.
Figure 16B:
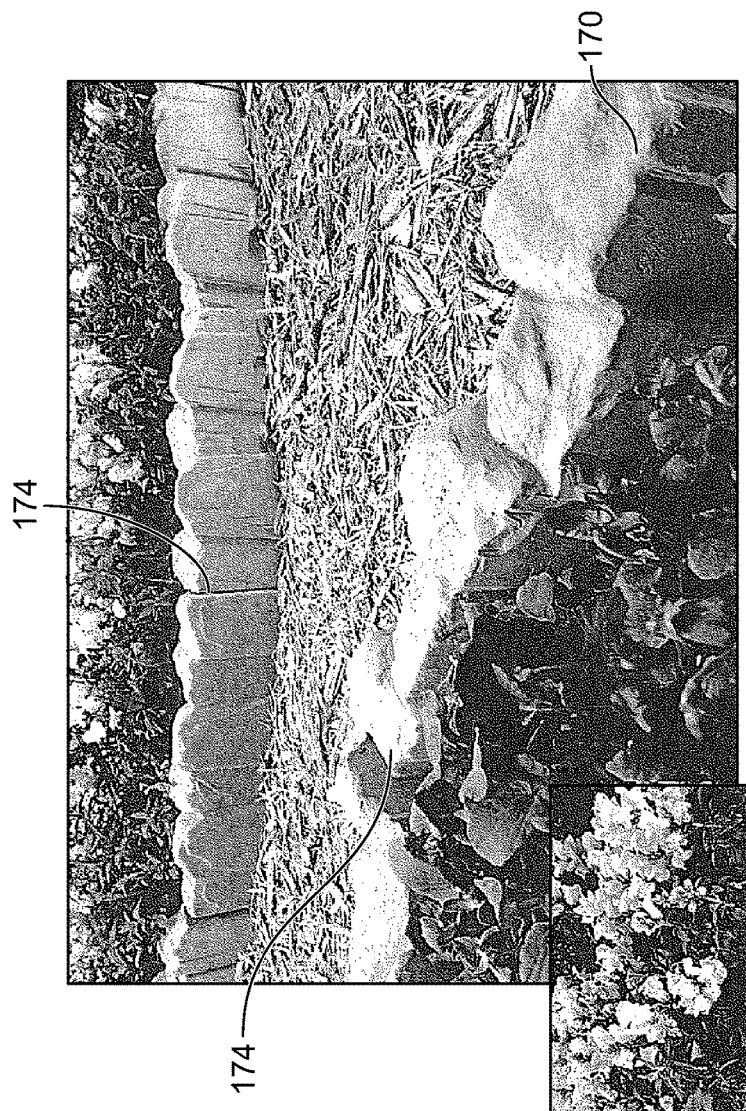
Figure 16C:

Providing such alternating segments gives the appearance of multiple stones being employed throughout a structure, though a significantly smaller number of stones (e.g., by a factor of 2, 4, 6, or greater multiples of 2) may be provided. FIGS. 16A and 16B show example structures formed by arranged edging units 170. The edging units 170, having six segments each in this example embodiment, are arranged end surface to side surface, e.g., at connection 172, and end surface to end surface, e.g., at connection 174. FIG. 16C shows the edging units 170 laying flat (i.e., on their side surfaces), connected end to end, and with adjacent side surfaces engaging one another. Flat arrangements of edging units can also provide pavers, retaining walls, etc.

FIGS. 17-23 show additional embodiment edging units, illustrating various additional features. It will be appreciated that the edging unit features disclosed herein can be combined in any feasible combination, and such combinations are contemplated herein.

Figure 17:
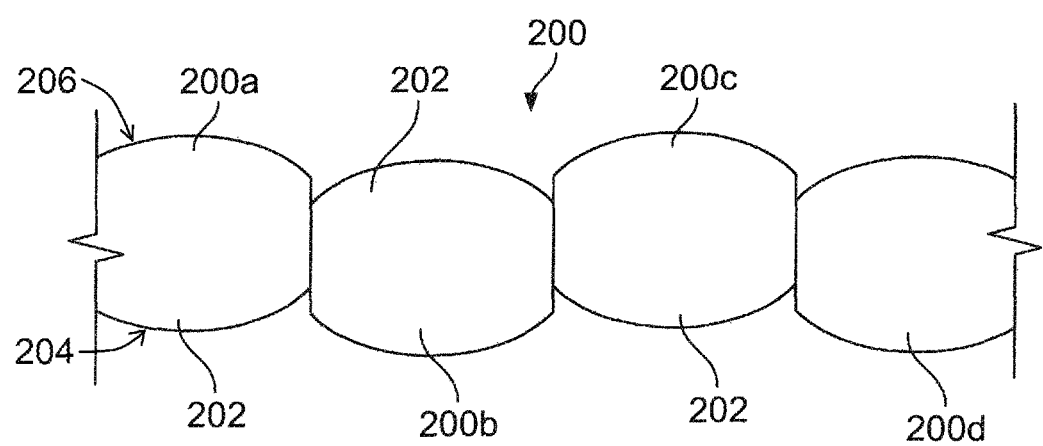
FIG. 17 is a simplified top plan view of an edging unit according to a fourteenth embodiment of the invention, illustrating offset segments having rounded side surfaces.

For example, FIG. 17 shows part of a top surface of an example edger unit 200 having four alternately offset segments 200a, 200b, 200c, 200d (additional outer pairs of segments can be provided). Each offset segment 200a, 200b, 200c, 200d has generally convex outer portions 202 along first and second side surfaces 204, 206. The inner pair of segments 200b, 200c can be, but need not be, of a different width than that of the outer pair of segments 200a, 200d.

In some example embodiments, the lateral gaps defined by offset segments also provide the ability to at least partially nest adjacent edging units along their side surfaces. For example, an outer portion of segment 200b can at least partially nest within the lateral gaps defined by the offsets between segments 200a and 200c. By providing substantially similar segments in opposed pairs, nesting of side surfaces can be provided in various segment configurations.

Figure 18A:
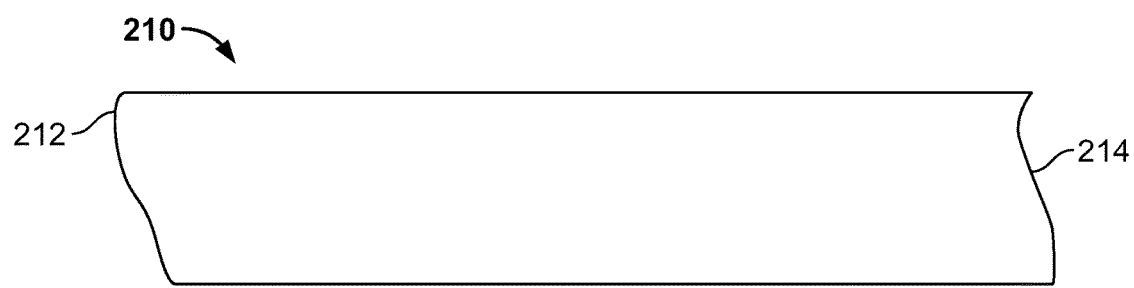
FIGS. 18A-18B are simplified top plan views of edging units having example angled and straight end connection surfaces, respectively.
Figure 18B:
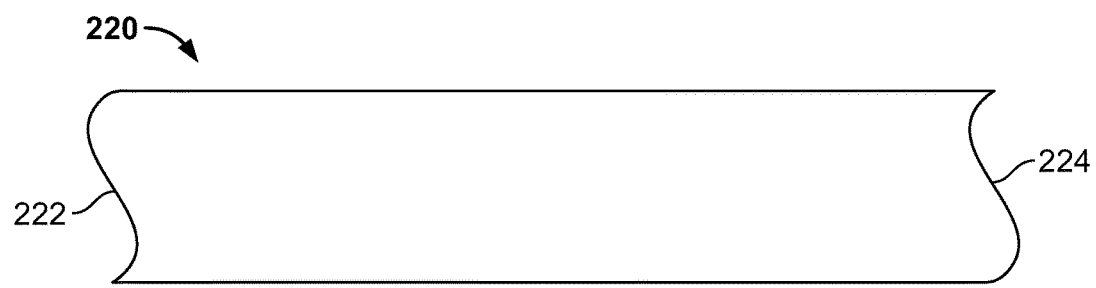
Figure 19:
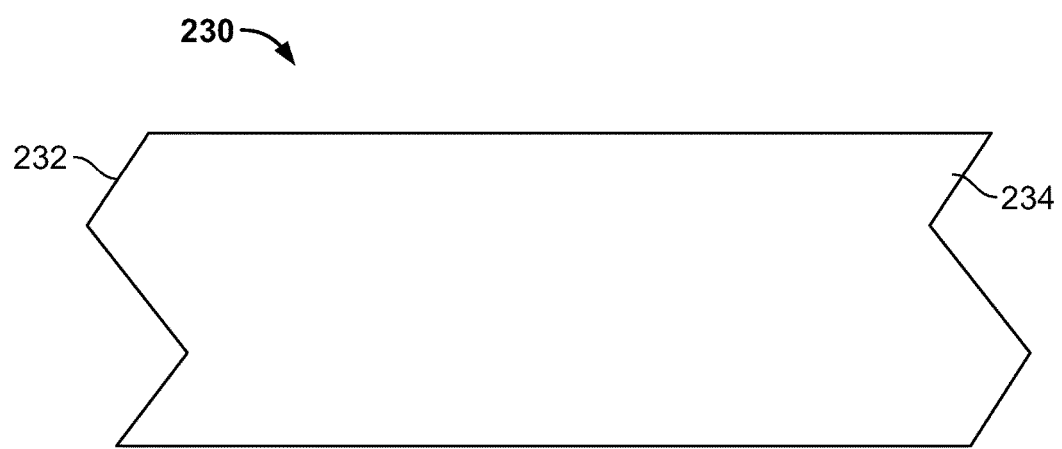
FIG. 19 is a simplified top plan view of an edging unit having jagged or linear end connection surfaces.

FIGS. 18A-18B and FIG. 19 show edging units 210, 220, 230 providing additional example configurations of end surfaces providing S-connections. The top surface, side surfaces, and/or bottom surface may otherwise be configured similarly to any of the edging units disclosed herein, including all variations disclosed herein. In edging unit 210, the end surfaces 212, 214 are translations of one another, and slanted at a substantially identical angle, as opposed to the oppositely slanted angles for end surfaces in FIGS. 2A-2B and elsewhere herein. FIG. 18B shows an edging unit 220 having end surfaces 222 that are oriented substantially straight, but respectively reversed in orientation. FIG. 19 shows an edging unit 230 having end surfaces 232, 234 with jagged (straight) convex and concave portions to provide jagged S-connections.

Figure 20:
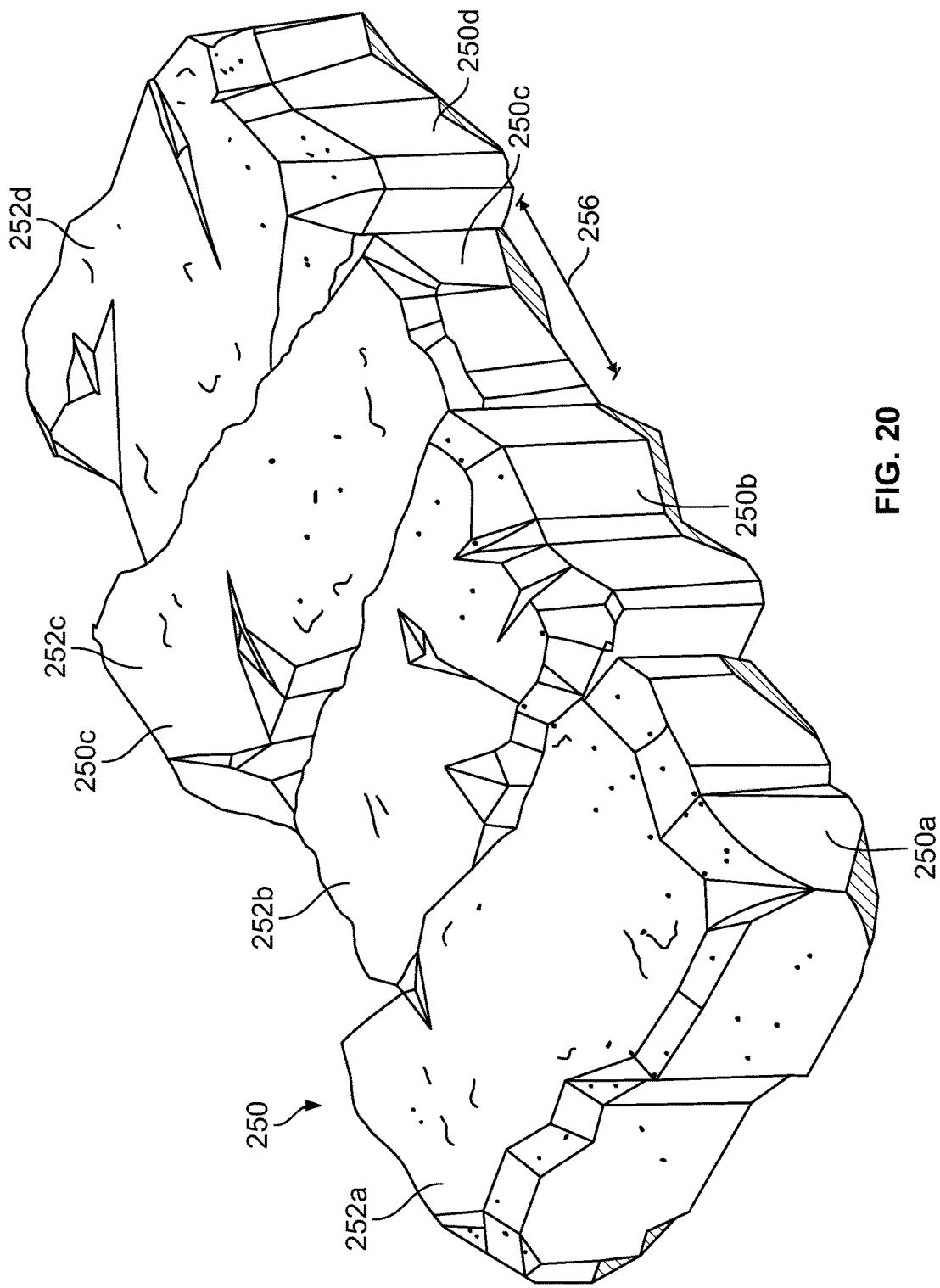
FIG. 20 is a perspective view of an edging unit according to a fifteenth embodiment of the invention, having a lower aspect ratio and four generally rectangular segments.

FIG. 20 shows another example edging unit 250 having a lower aspect ratio (e.g., height to width), including four alternately offsetting segments 250a, 250b, 250c, 250d. As shown, each segment 250a, 250b, 250c, 250d is respectively rectangular in plan view, and has top surface 252a, 252b, 252c, 252d which alternately slope down or up, providing two opposed pairs of segments (252b with 252c, and 252a with 252d). The segments 250a, 250b, 250c, 250d include irregular surfaces on top and side surfaces (the bottom can be flat, but need not be in all embodiments). Lateral gaps (e.g., gap 256 between segments 250b and 250d) between segments can optionally provide for nesting of side surfaces of adjacent units. The example edging unit 250 further includes undercuts (shown hatched or shadowed in FIG. 20), which may be added in selective locations or run continuously around the edging unit. Undercuts can be provided on any side, in any combination. Undercuts provide a more natural, stone-like appearance to the example edging unit 250 versus a continuous flat bottom surface, for example, when edging units are stacked on top of one another. Undercuts are not limited to the edging unit 250, but instead may be provided for any of the edging units disclosed or contemplated herein.

Figure 21:
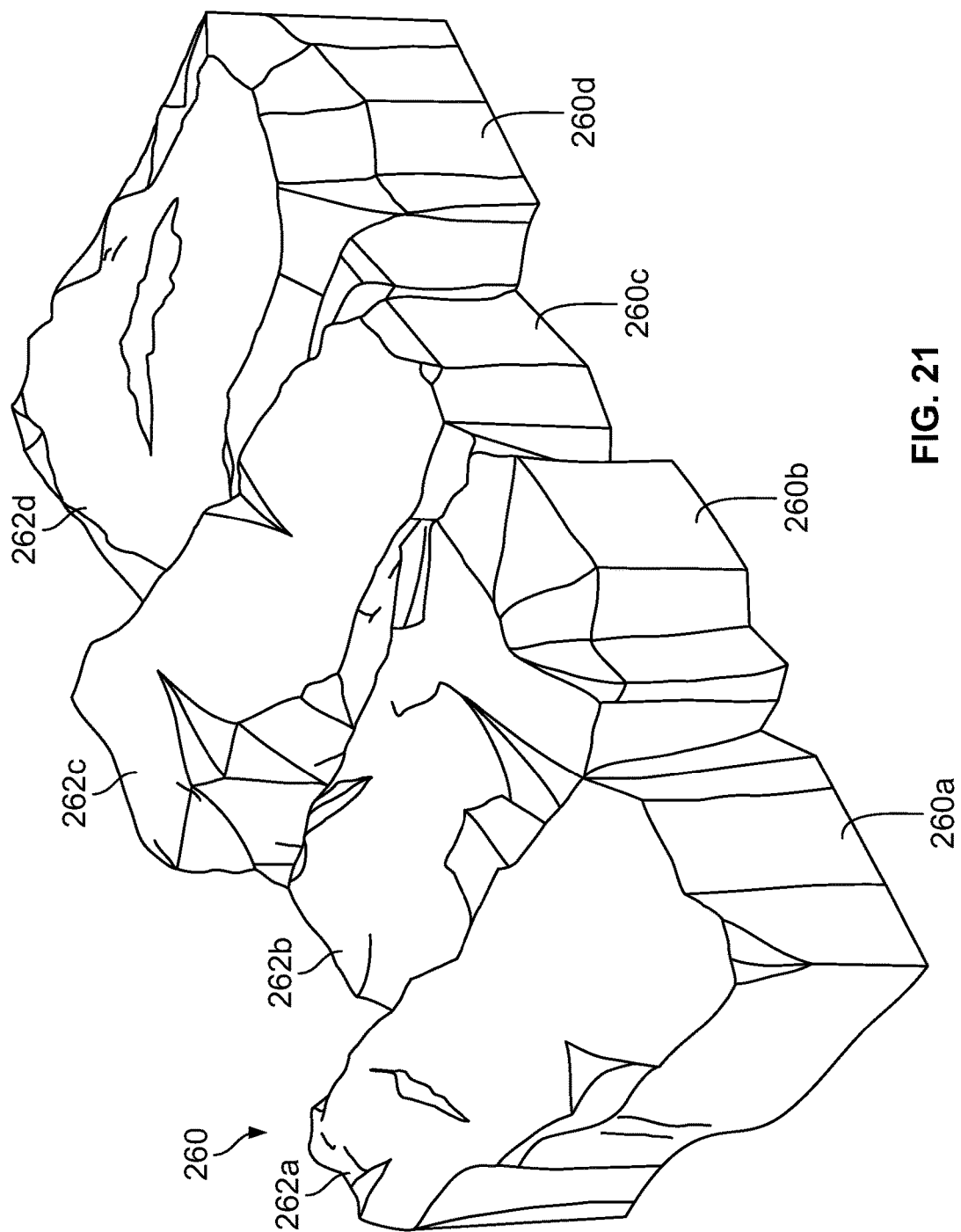
FIG. 21 is a perspective view of an edging unit according to a sixteenth embodiment of the invention, having a lower aspect ratio and four non-rectangular segments.

FIG. 21 shows an edging unit 260 with segments 260a, 260b, 260c, 260d similar to segments 250a, 250b, 250c, 250d, but generally orthogonally shaped in plan view. In this example embodiment, segment 260a is generally orthogonal in plan view, and opposing segment 260A is generally rectangular in plan view. Segments 260a, 260b, 260c, 260d include respective top surfaces 262a, 262b, 262c and 262d. Stacking points respectively disposed on these segments as disclosed herein may still nest. Edging units and/or segments can be rectangular, orthogonal, trapezoidal, or other shapes.

Figure 22:
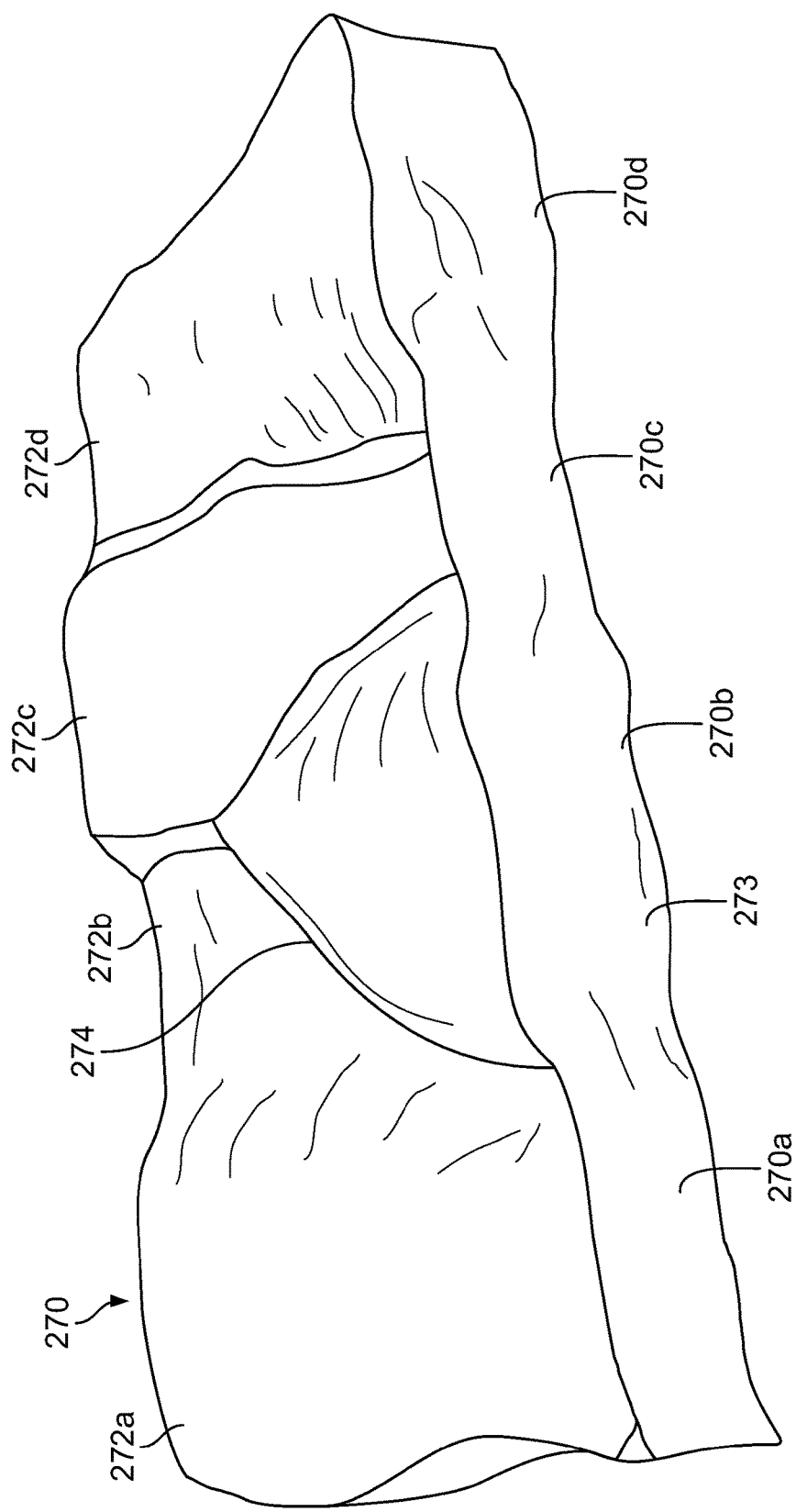
FIG. 22 is a perspective view of an edging unit according to a seventeenth embodiment of the invention, having a lower aspect ratio and four irregular segments.

FIG. 22 shows an edging unit 270 having irregular shaped segments 270a, 270b, 270c, 270d with respective top surface segments 272a, 272b, 272c, 272d. The segments 270a, 270b, 270c, 270d in this example embodiment are substantially undivided along side surface 273, though undercuts can be provided (only one side surface is shown in FIG. 22, the opposing side surface can be, but need not be, configured similarly). In edging unit 270, top surface segment 272b includes a false joint 274, creating an impression of an enlarged segment 272a. However, the top surface segments 272a, 272b, 272c, 272d still provide upward or downward slopes in alternating directions.

As discussed above, the segments, particularly the top surfaces of segments, can be of essentially any shape. However, certain segment shapes can allow nesting between the side surfaces offset segments of adjacent units. Polygonal shapes, obround shapes, etc. can provide nesting by permitting a portion of a segment of one side surface to nest within a lateral gap defined by segments of the opposing side surface. For some segment shapes in plan view, such as trapezoids, the trapezoids can be configured in some embodiments to allow nesting of side surfaces as well.

Figure 23:
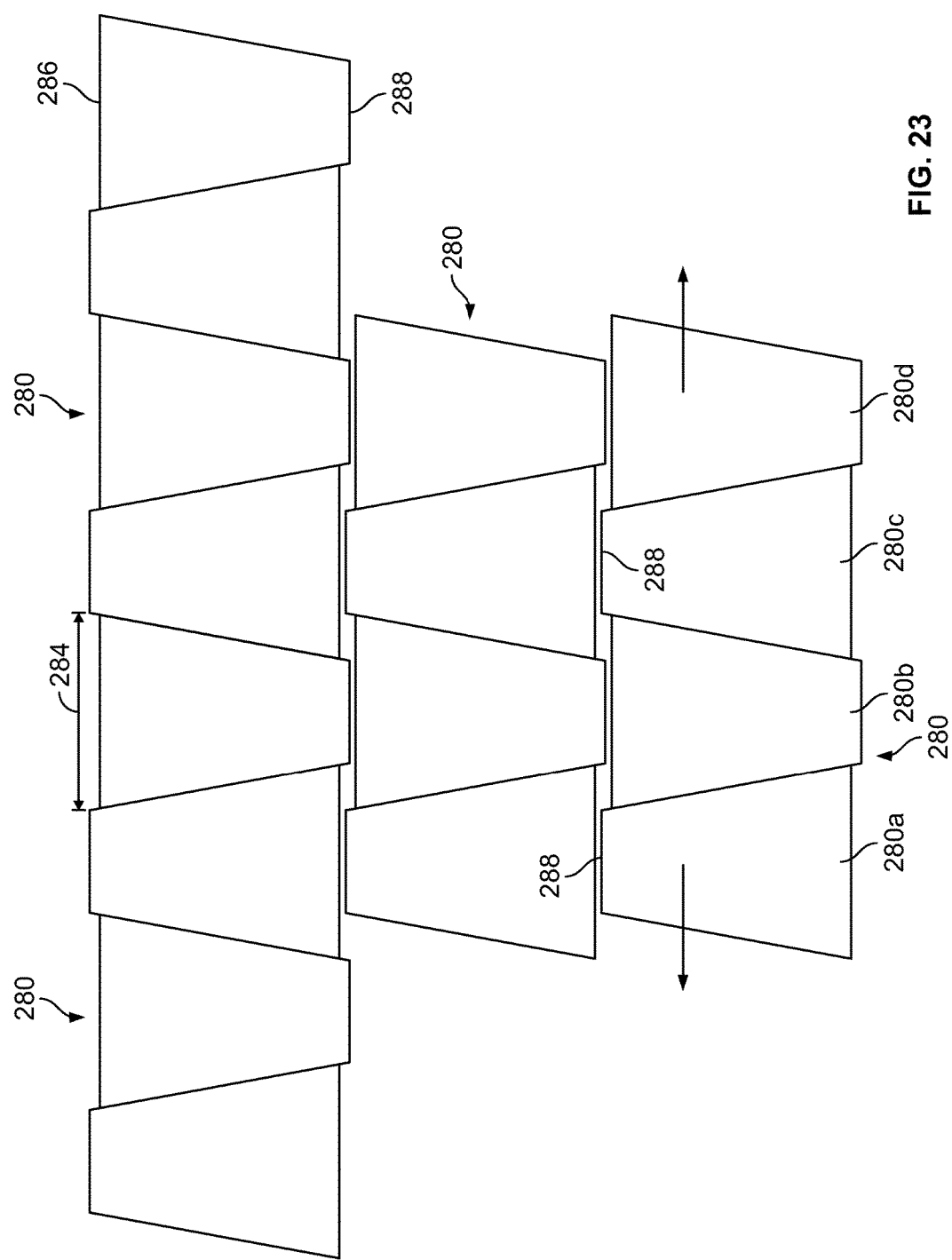
FIG. 23 is a simplified top plan view of a plurality of edging units according to an eighteenth embodiment of the invention, having enlarged trapezoidal side surfaces to provide nesting sides.

For example, FIG. 23 shows edging units 280 having four segments 280a, 280b, 280c, 280d, which are trapezoidal in plan view. Alternate segments reverse (invert) the orientation of the trapezoids (as also provided in edging unit 10). The segments 280a, 280b, 280c, 280d are offset from one another to define lateral gaps 284, as discussed elsewhere herein. Each trapezoid has a wide base 286 and a narrow base 288. The trapezoids are oriented relative to the offset of the segments 280a, 280b, 280c, 280d so that the lateral gaps 284 are defined by the outer portions of the narrow bases 288. For example, a lateral gap is defined between narrow bases 288 of the trapezoids of segments 280a and 280c (by contrast, the lateral gap 144a in the edging unit 140 of FIG. 15B is defined between the wide bases of the trapezoids of segments 140a, 140c). In this way, the lateral gaps 284 are preferably each wider than the narrow base 288. For example, the lateral gaps 284 can be as wide as the wide base 286. This allows the narrow bases 288 to at least partially nest within the lateral gaps, reducing space between side surfaces of arranged edging units 280. Further, the edging units 280 can slide laterally with respect to one another in this arrangement due to the clearance defined between the lateral gaps 284 and the narrow bases 288 of the segments 280a, 280b, 280c, 280d.

Edging units can vary in texture, shape, orientation, material, number of segments, other ways. Rounded and/or irregular shapes can be provided as disclosed herein, or as otherwise will be appreciated by those of ordinary skill in the art, to provide a more natural appearance. Units can vary by length, width, angles, etc. Variations can also be provided to create gaps between the contact points of adjacent edging units, and these gaps can be filled with material, remain open, etc. Sides of stacking points can be alternated. Multiple edging units can be lined up, and/or individual edging units can be expanded.

Other features of connection surfaces, including various S-connections, and methods for construction and/or modifying blocks can be found in U.S. Patent App. Pub. No. 2014/0140766 A1, U.S. patent application Ser. No. 14/081,976, filed Nov. 15, 2013 and entitled CONNECTION SURFACE FOR A STRUCTURAL UNIT, which is incorporated by reference herein in its entirety.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. An edging unit comprising:
a structure having opposed top and bottom surfaces, opposed first and second side surfaces extending between said opposed top and bottom surfaces, and opposed first and second end surfaces extending between said opposed top and bottom surfaces and between said first and second side surfaces;
the structure including a plurality of structural segments, each structural segment including a segment of the top surface, a segment of the first side surface, and a segment of the second side surface;
wherein said plurality of structural segments comprises a plurality of pairs of opposed structural segments, each of said pairs of opposed structural segments including first and second structural segments respectively opposing one another with respect to a center of the edging unit, wherein the segment of the top surface of the first structural segment defines a substantially upward slope extending between the first side surface and the second side surface and the segment of the top surface of the second structural segment defines a substantially downward slope extending between the first side surface and the second side surface generally opposite in direction to the first slope;
wherein said plurality of pairs of opposed structural segments comprises an inner pair of opposed structural segments and an outer pair of opposed structural segments;
wherein the first structural segment of the inner pair of opposed structural segments opposes the first structural segment of the outer pair of opposed structural segments with respect to the center and the second structural segment of the inner pair of opposed structural segments opposes the second structural segment of the outer pair of opposed segments with respect to the center,
wherein the first structural segment of the inner pair of opposed structural segments is disposed adjacent to the second segment of the outer pair of opposed structural segments;
wherein centers of adjacent structural segments are alternately offset from one another in plan view along a first direction between the first side surface and the second side surface such that lateral gaps are defined in plan view between outer portions of alternate structural segments, said lateral gaps being disposed alternately along the first side surface and along the second side surface; and
wherein, for each of said pairs of opposed structural segments, a center of the first structural segment is offset from a center of the second structural segment in plan view along the first direction.

2. The edging unit of claim 1,
wherein, for each of the plurality of pairs of opposed structural segments,
the segment of the top surface of the structural segment defines a lower surface near the first side surface transitioning at the upward slope to an upper surface near the second side surface; and
the segment of the top surface of the second opposed segment defines an upper surface near the first side surface transitioning at the downward slope to a lower surface near the second side surface;
wherein the upward slope and the downward slope are generally complementary to one another.

3. The edging unit of claim 2, wherein, for each of the first and second opposed structural segments, an upper stacking point is disposed on the upper surface and a lower stacking point is disposed on the lower surface;
wherein the upper stacking point of the first structural segment, the lower stacking point of the first structural segment, the upper stacking point of the second structural segment, and the lower stacking point of the second structural segment are respectively arranged symmetrically along the top surface with respect to a center of the top surface.

4. A structure comprising:
a plurality of edging units, each edging unit according to claim 3;
wherein at least a portion of the top surface of a first one of the edging units faces and nests with at least a portion of the top surface of a second one of the edging units;
wherein respective ones of the stacking points of the first one of the edging units contacts respective ones of the stacking points of the second one of the edging units.

5. The edging unit of claim 2, wherein the upward slope of the inner pair of opposed segments and the upward slope of the outer pair of opposed segments are unequal to one another.

6. The edging unit of claim 1,
wherein each of the opposed structural segments generally define a trapezoid in plan view;
wherein the trapezoids of alternative structural segments are inverted with respect to one another;
wherein each trapezoid has a wide base and a narrow base.

7. The edging unit of claim 6, wherein the top surface, the first side surface, and the second side surfaces are textured.

8. The edging unit of claim 1, wherein each of the first and second end surfaces comprise a convex portion and a concave portion to define respective first and second S-shapes in plan view.

9. The edging unit of claim 8, wherein the second S-shape is a rotation of the first S-shape.

10. The edging unit of claim 1,
wherein said plurality of pairs of opposed structural segments comprises at least six segments of the top surface having slopes in respectively alternating directions.

11. A structure comprising:
a plurality of edging units, each edging unit according to claim 1;
wherein the first side surface of a first one of the edging units faces and nests with the first side surface of a second one of the edging units;
wherein at least one of the outer portions of the alternate segments of the first one of the edging units is disposed within a respective one of the lateral gaps defined by the outer portions of the alternate segments of the second one of the edging units; and
wherein at least one of the outer portions of the alternate segments of the second one of the edging units is disposed within a respective one of the lateral gaps defined by the outer portions of the alternate segments of the first one of the edging units.

12. The edging unit of claim 1, wherein the first side surface and the second side surface extend substantially vertically between the top surface and the bottom surface.

* * * * *

UNITED STATES PATENT AND TRADEMARK OFFICE
CERTIFICATE OF CORRECTION

PATENT NO. : 9,832,934 B2
APPLICATION NO. : 15/052782
DATED : December 5, 2017
INVENTOR(S) : Thomas S. Riccobene and Robert A. MacDonald Page 1 of 1

It is certified that error appears in the above-identified patent and that said Letters Patent is hereby corrected as shown below:

In the Claims

Column 16, Line 11: Please delete "top surface of the structural segment" and insert -- top surface of the first structural segment -- therefor.

Signed and Sealed this
Twenty-second Day of May, 2018

Andrei Iancu
*Director of the United States Patent and Trademark Office*